INVENTOR
M. RASPANTI
BY John C Albrecht
ATTORNEY

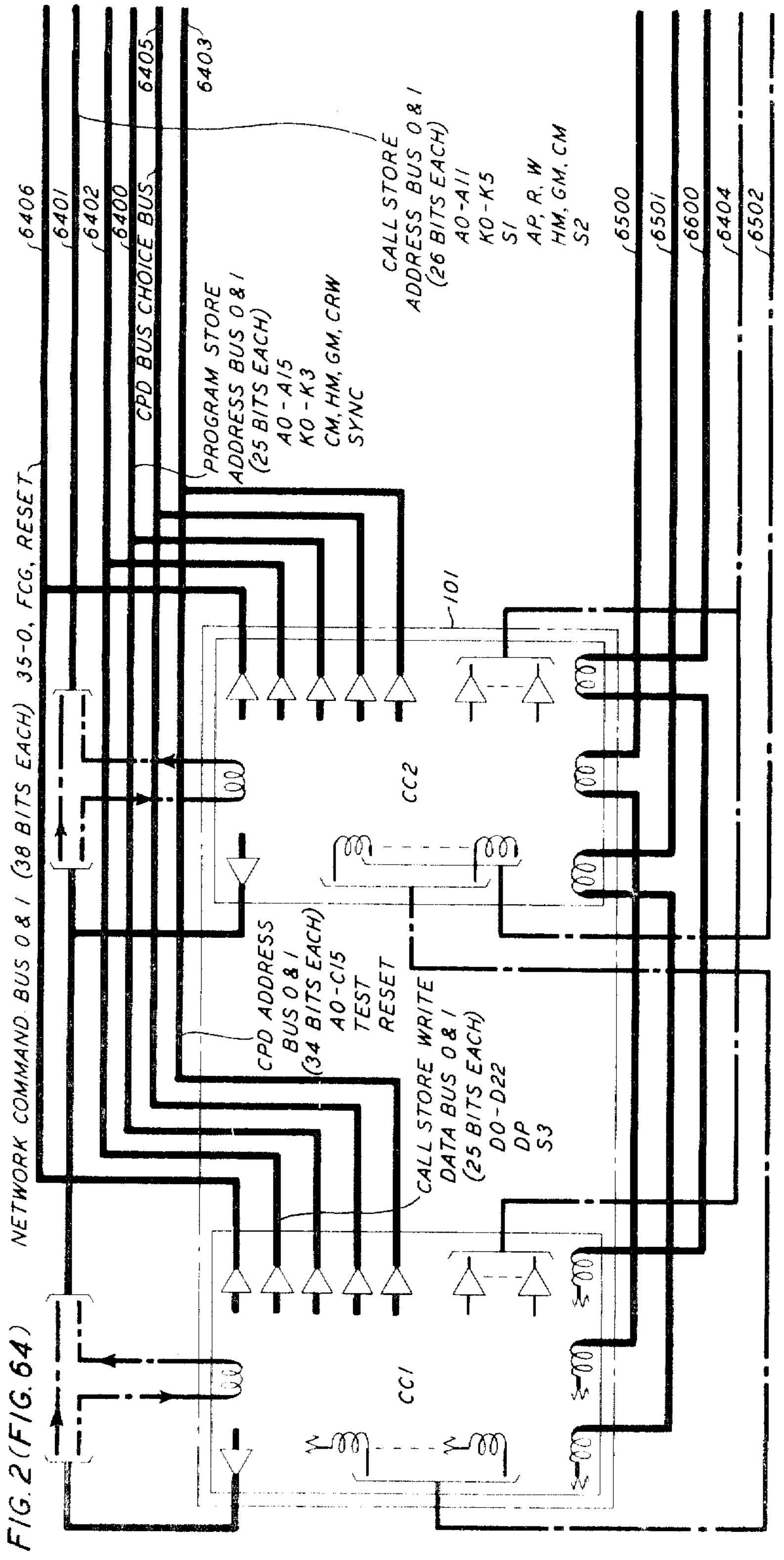
FIG. 2 (FIG. 64)

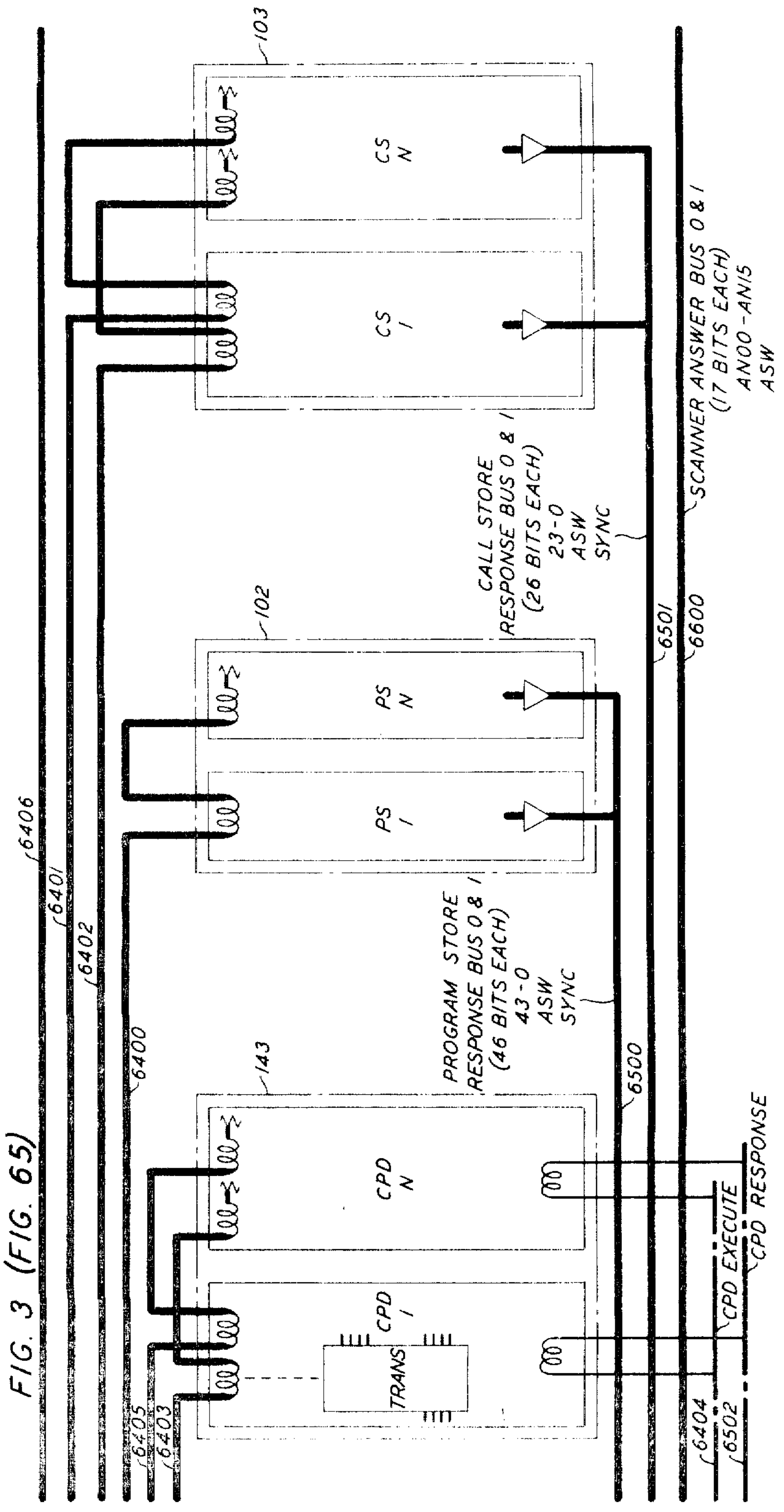
FIG. 3 (FIG. 65)

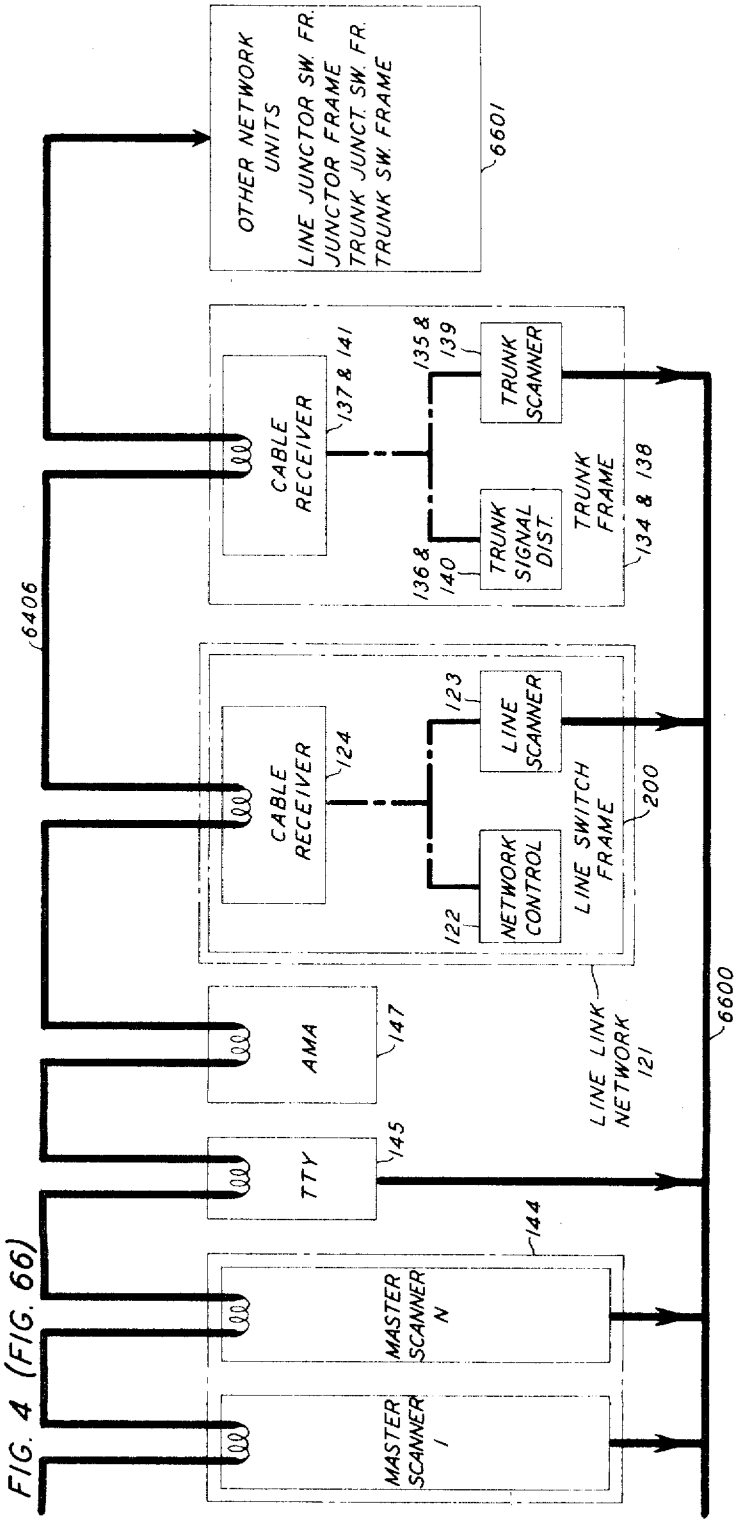
FIG. 4 (FIG. 66)

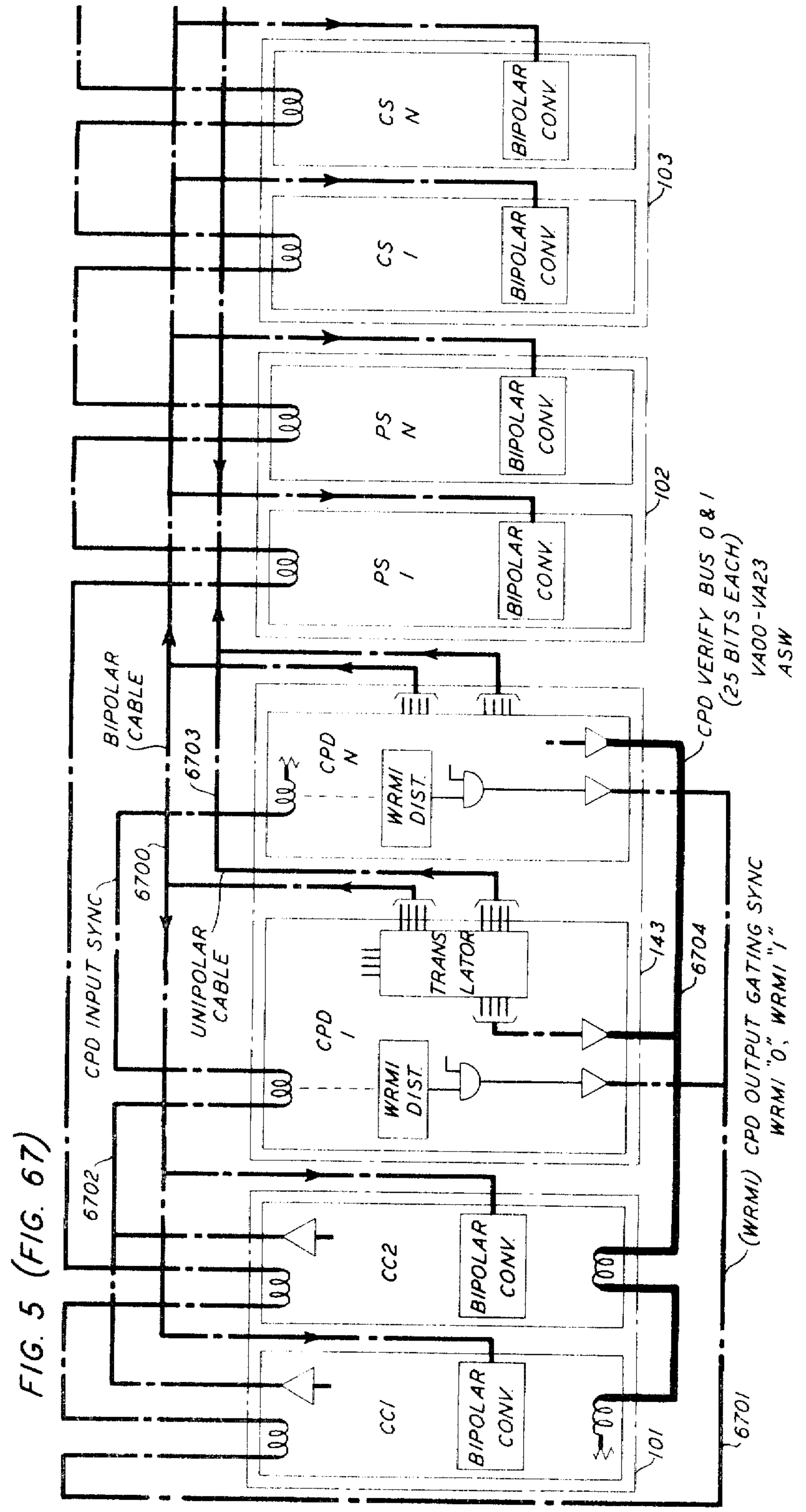
FIG. 5 (FIG. 67)

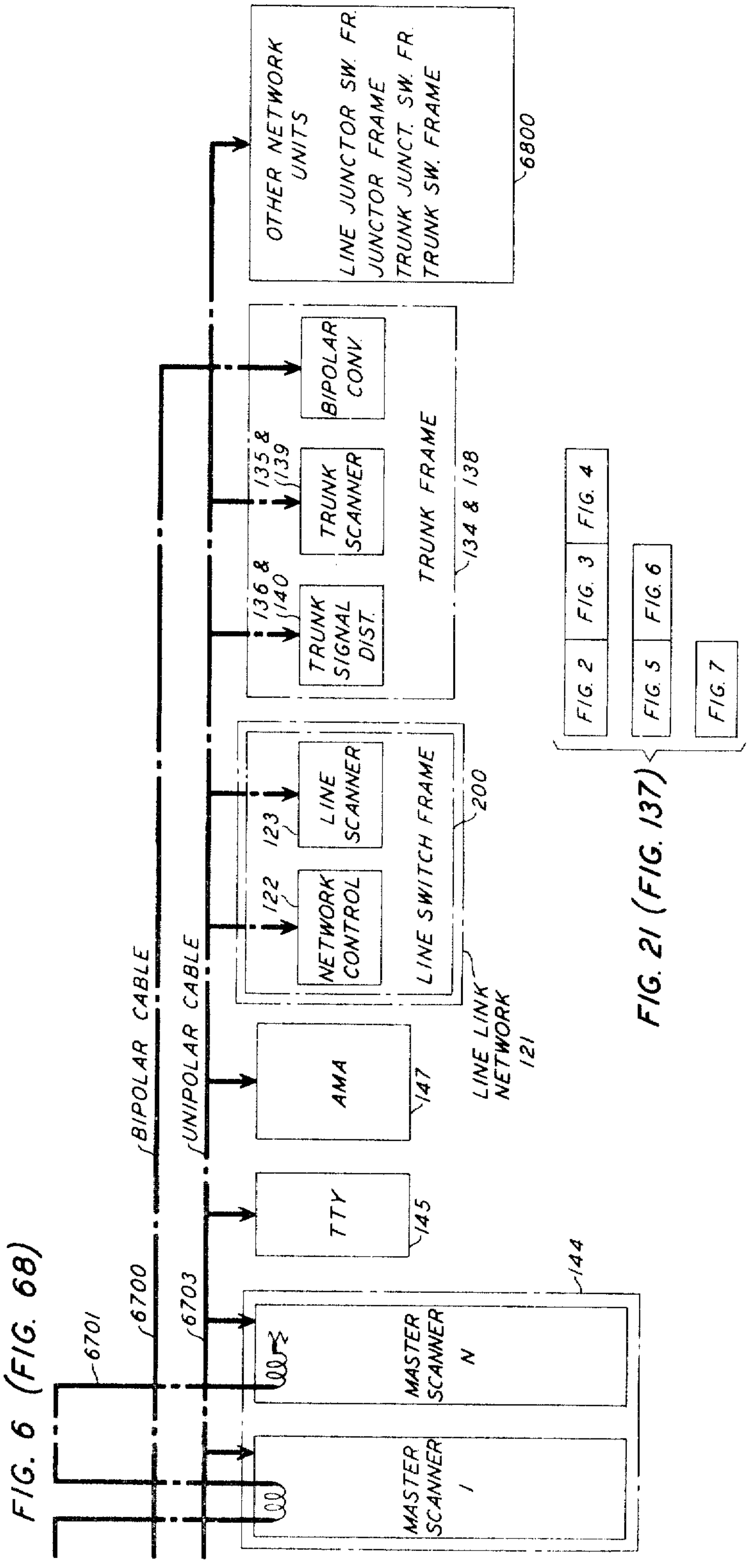
FIG. 6 (FIG. 68), FIG. 21 (FIG. 137)

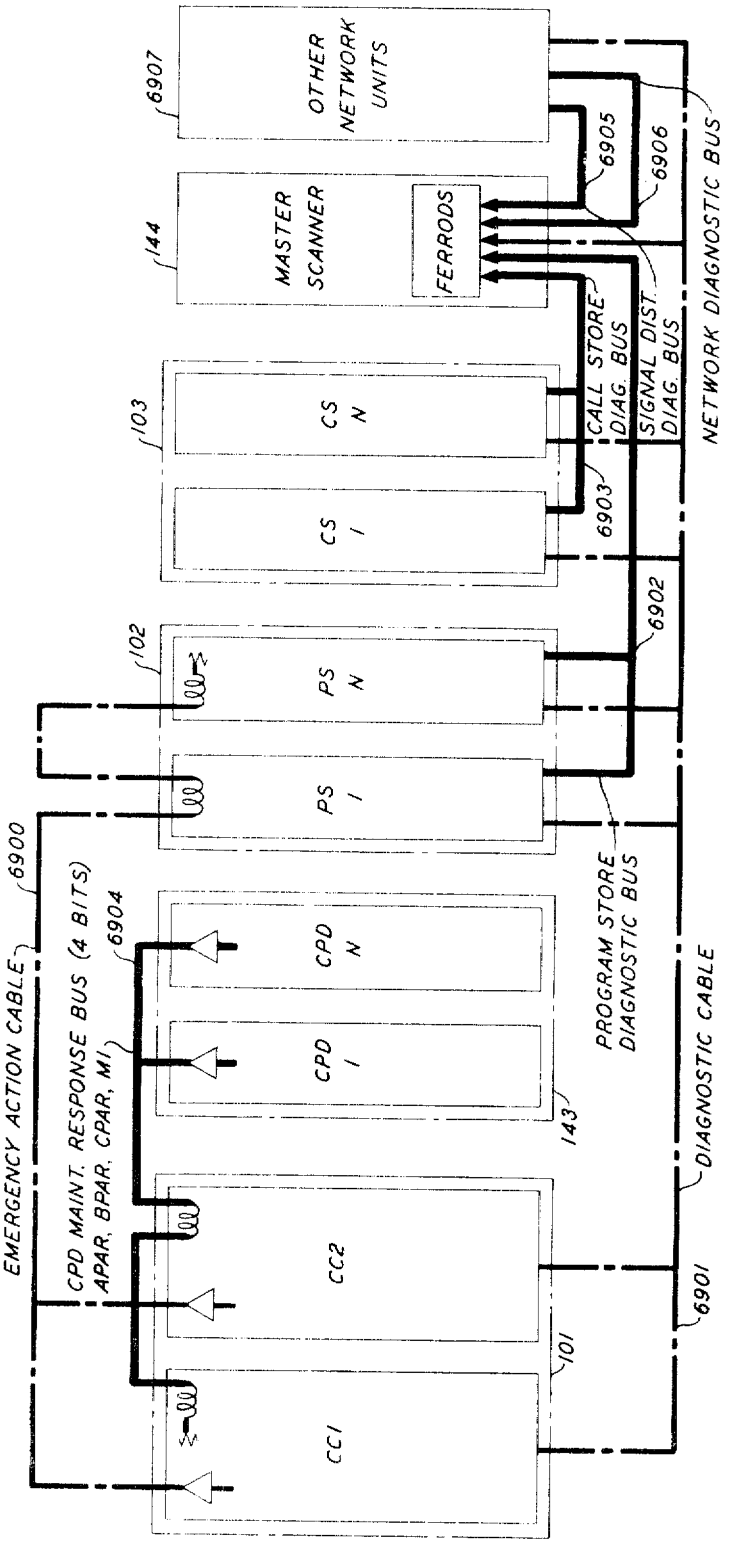
FIG. 7 (FIG. 69)

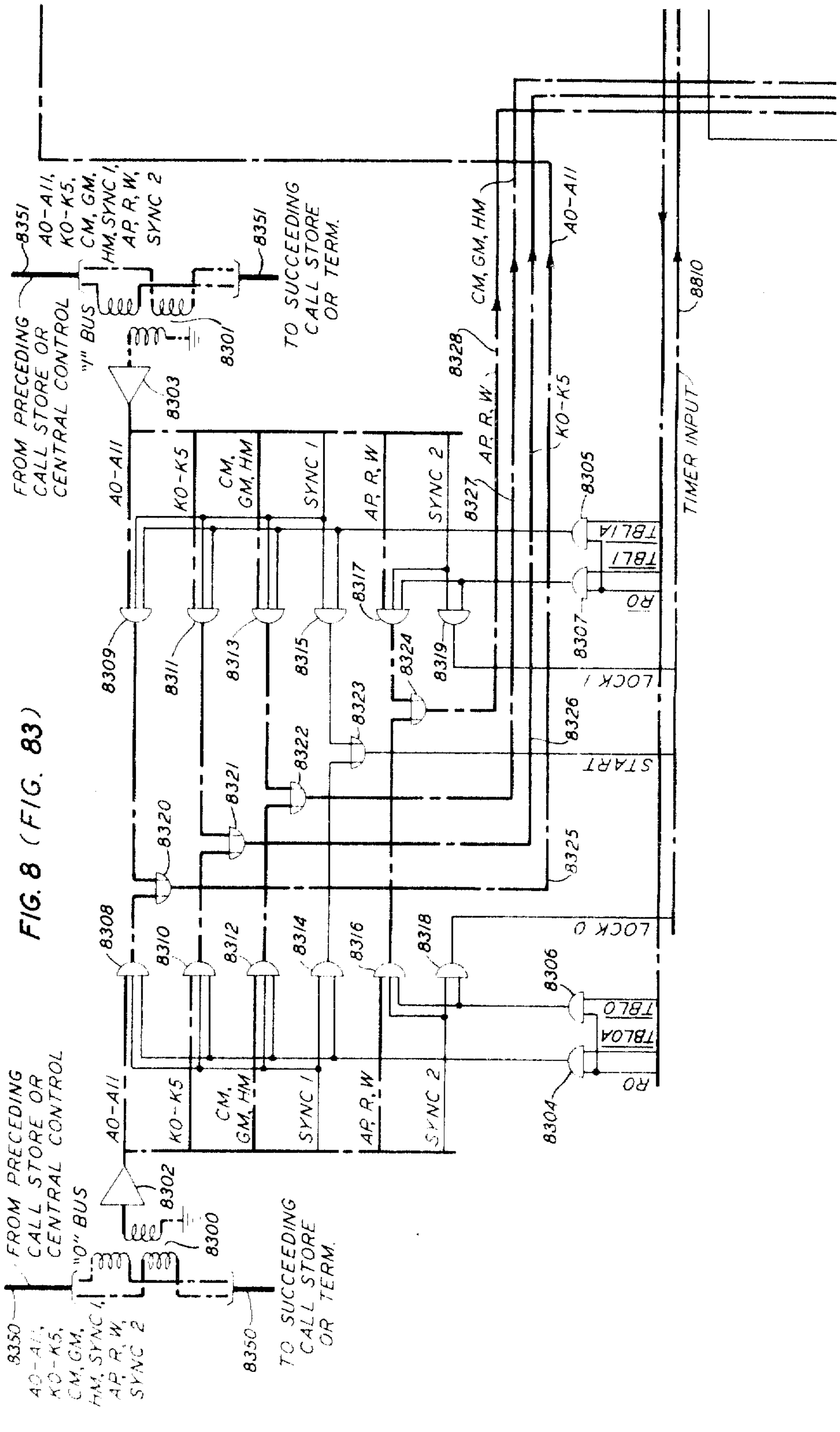
FIG. 8 (FIG. 83)

April 4, 1967 M. RASPANTI 3,312,947
PLURAL MEMORY SYSTEM WITH INTERNAL MEMORY TRANSFER AND DUPLICATED INFORMATION
Filed Dec. 31, 1963 20 Sheets-Sheet 9
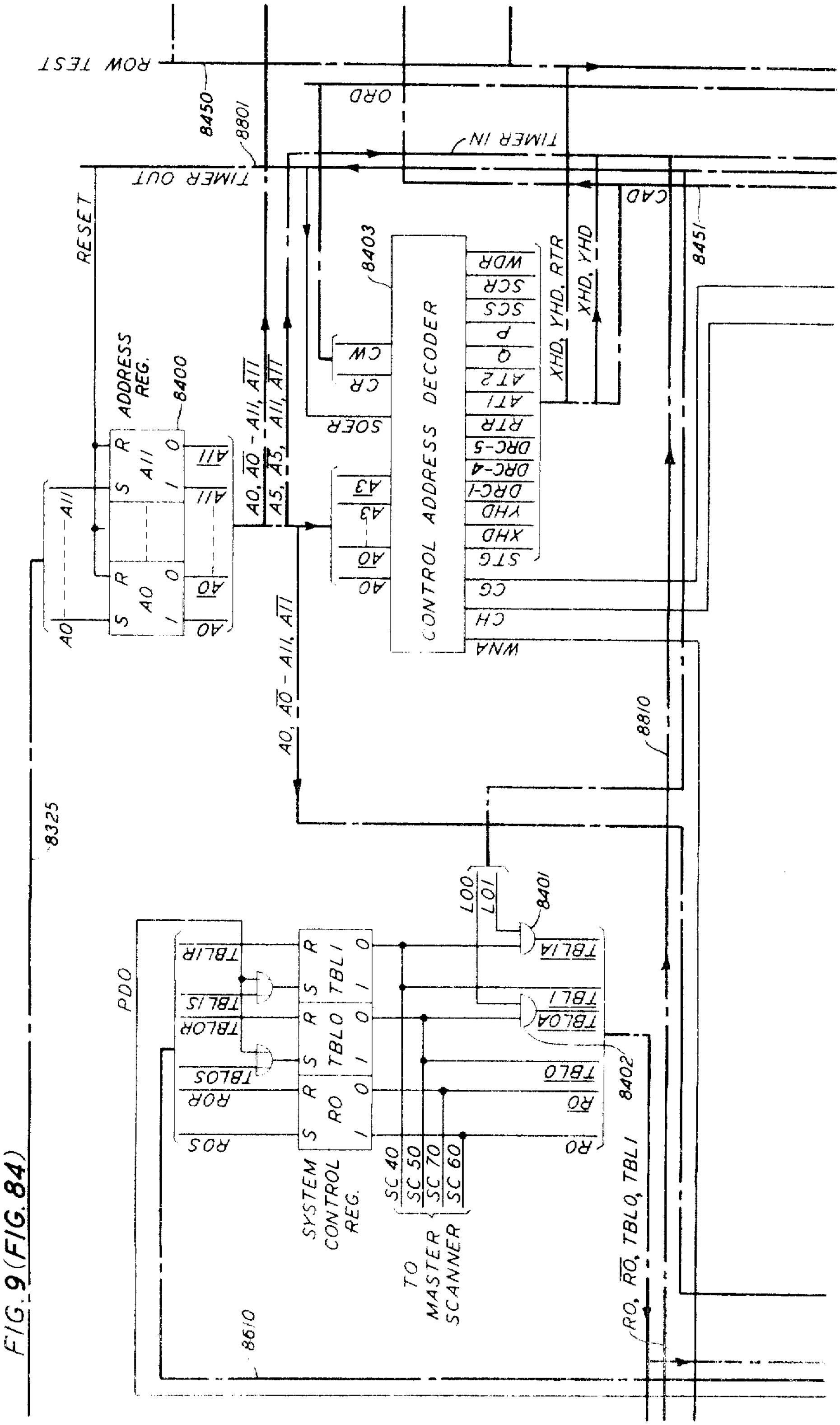
FIG. 9 (FIG. 84)

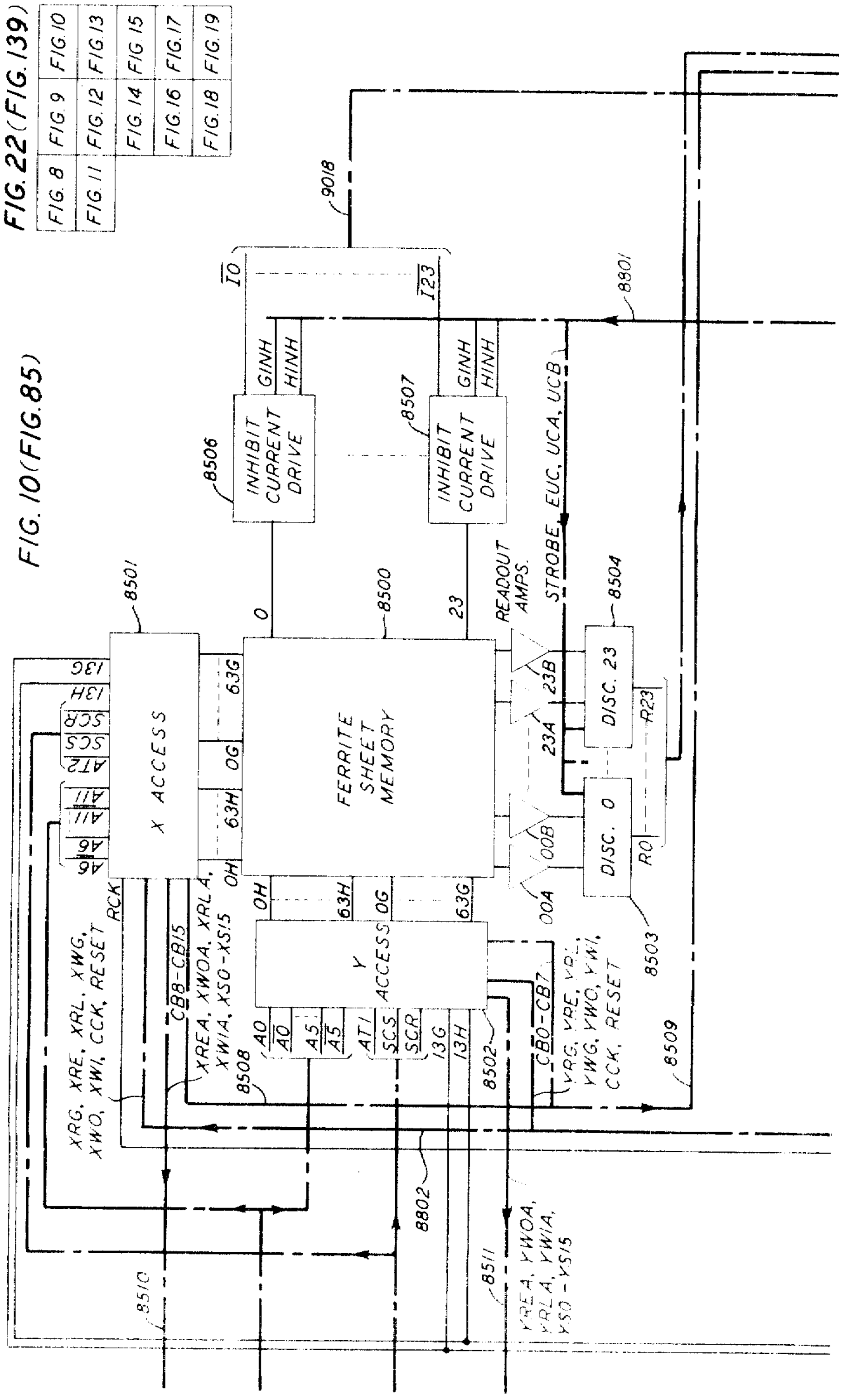
FIG. 22 (FIG. 139), FIG. 10 (FIG. 85)

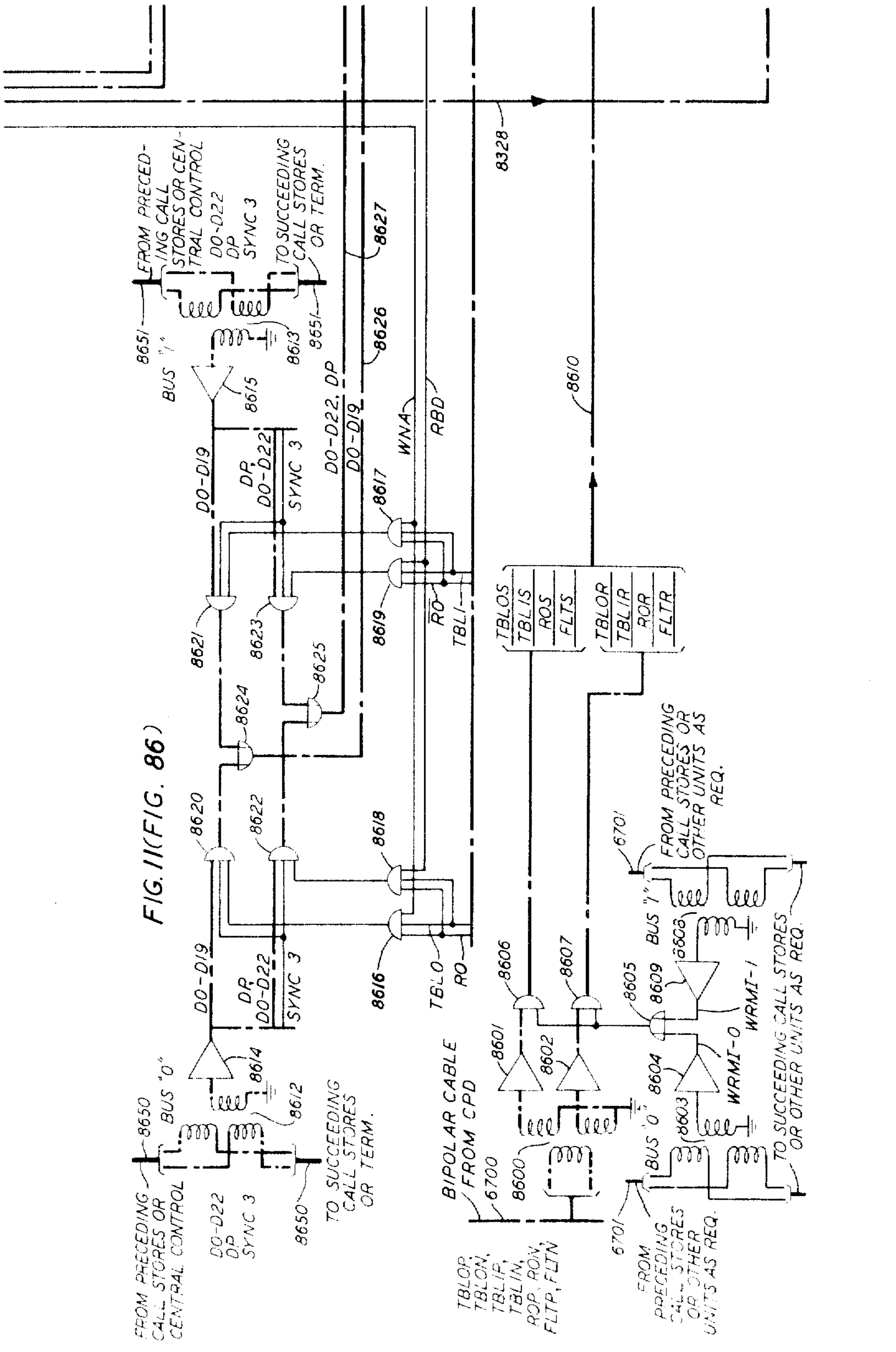
FIG. 11 (FIG. 86)

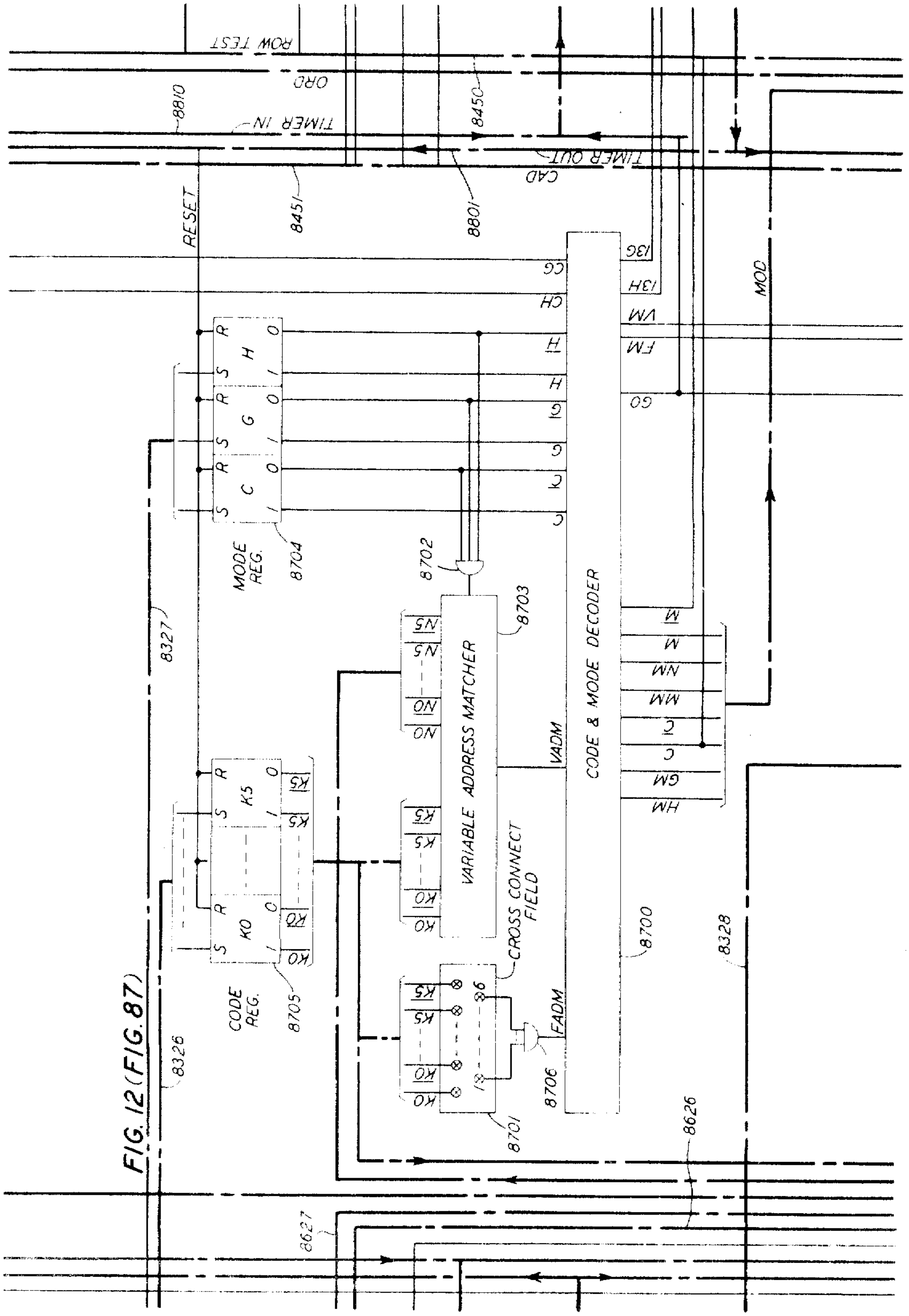
FIG. 12 (FIG. 87)

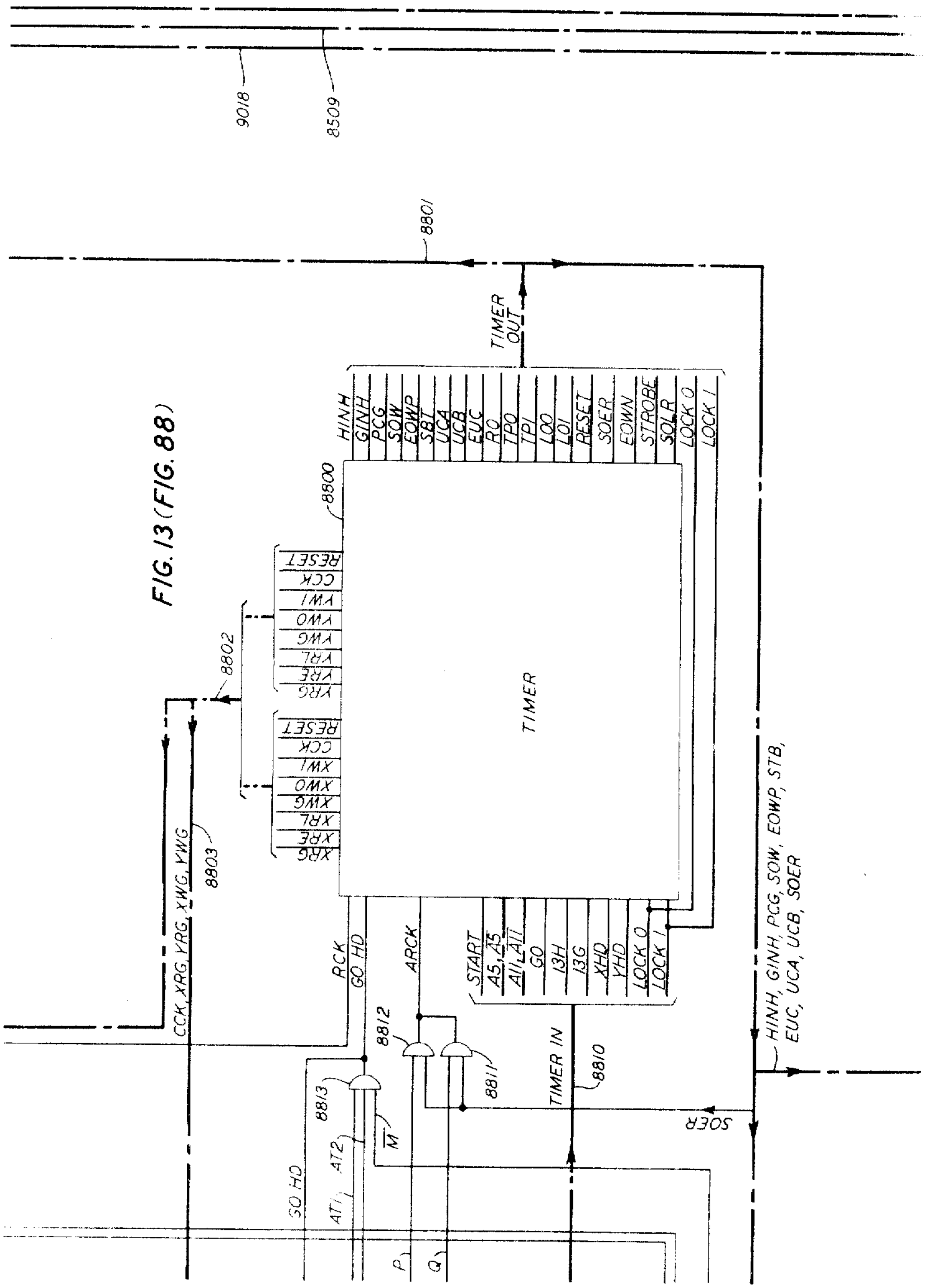
FIG. 13 (FIG. 88)

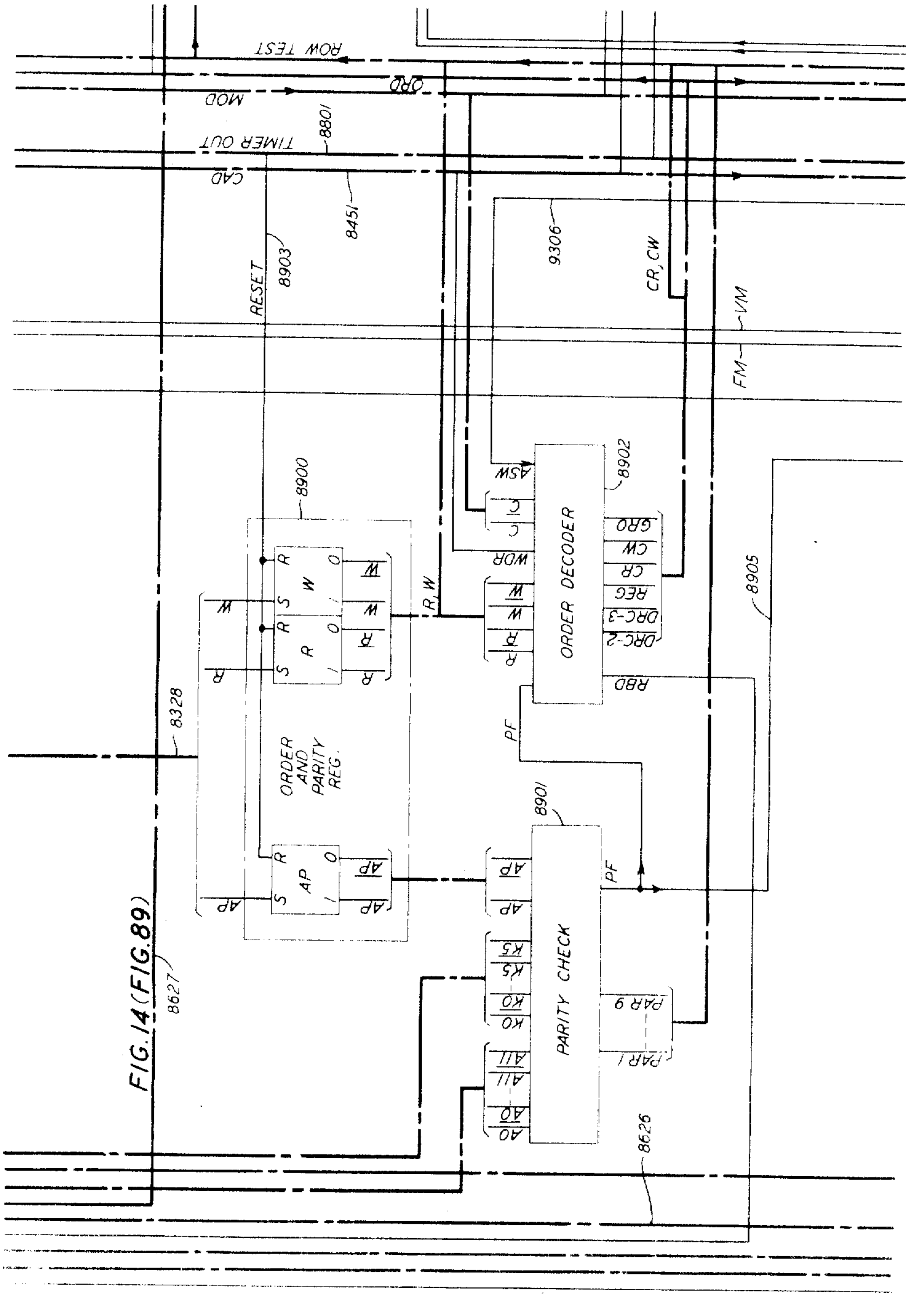
FIG. 14 (FIG. 89)

April 4, 1967 M. RASPANTI 3,312,947
PLURAL MEMORY SYSTEM WITH INTERNAL MEMORY TRANSFER AND DUPLICATED INFORMATION
Filed Dec. 31, 1963 20 Sheets-Sheet 15
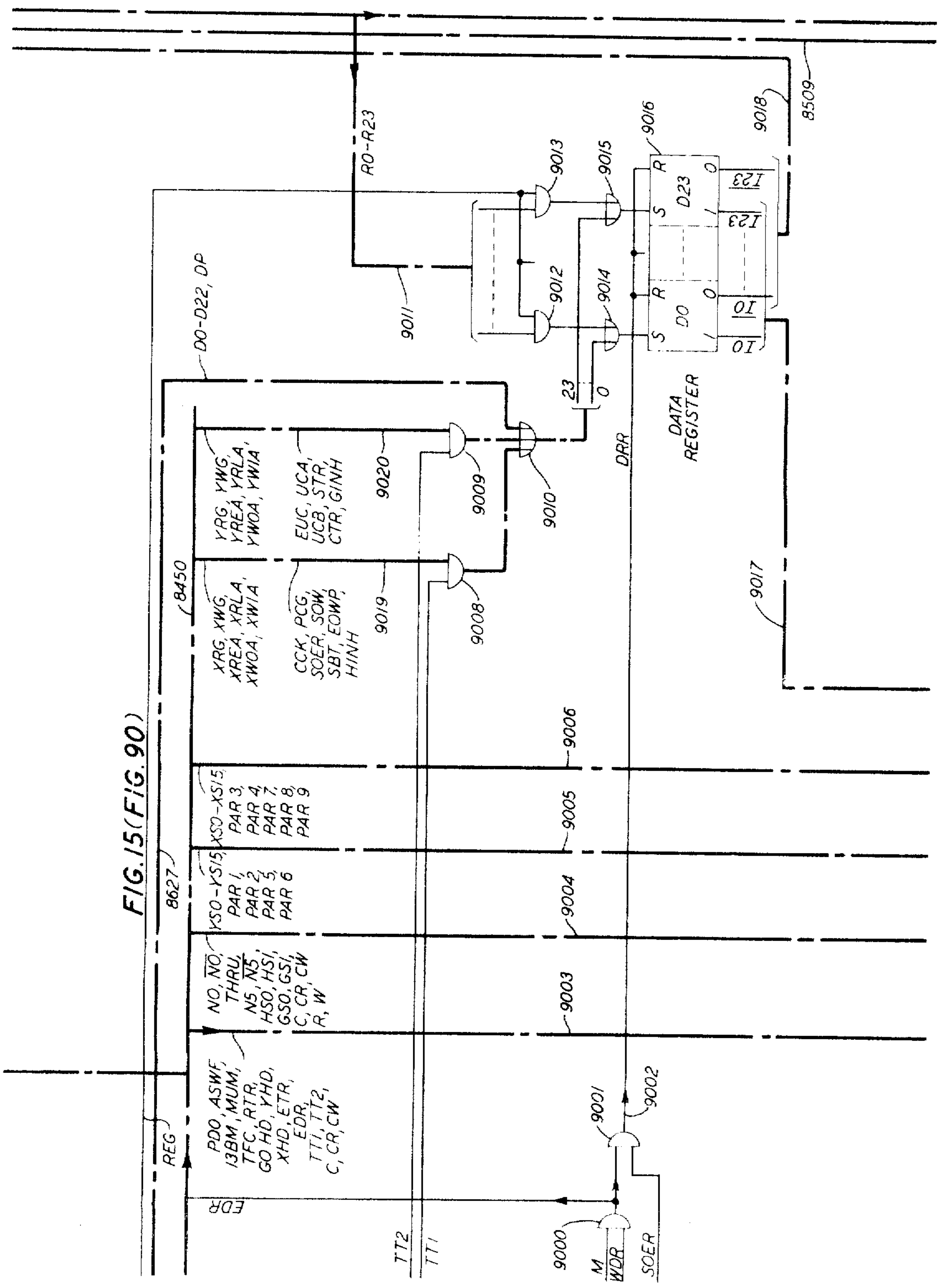
FIG. 15 (FIG. 90)

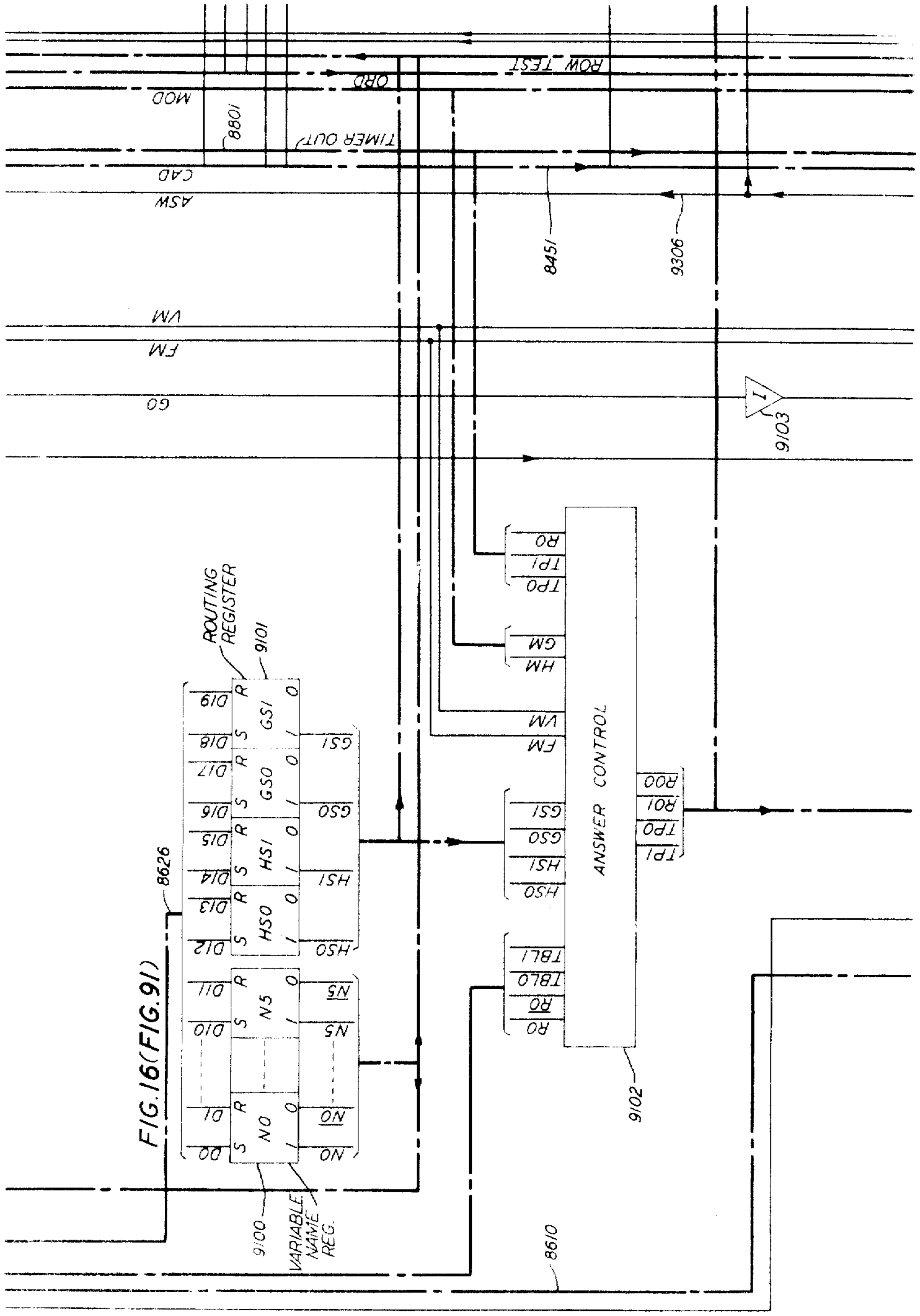
FIG.16(FIG.9I)

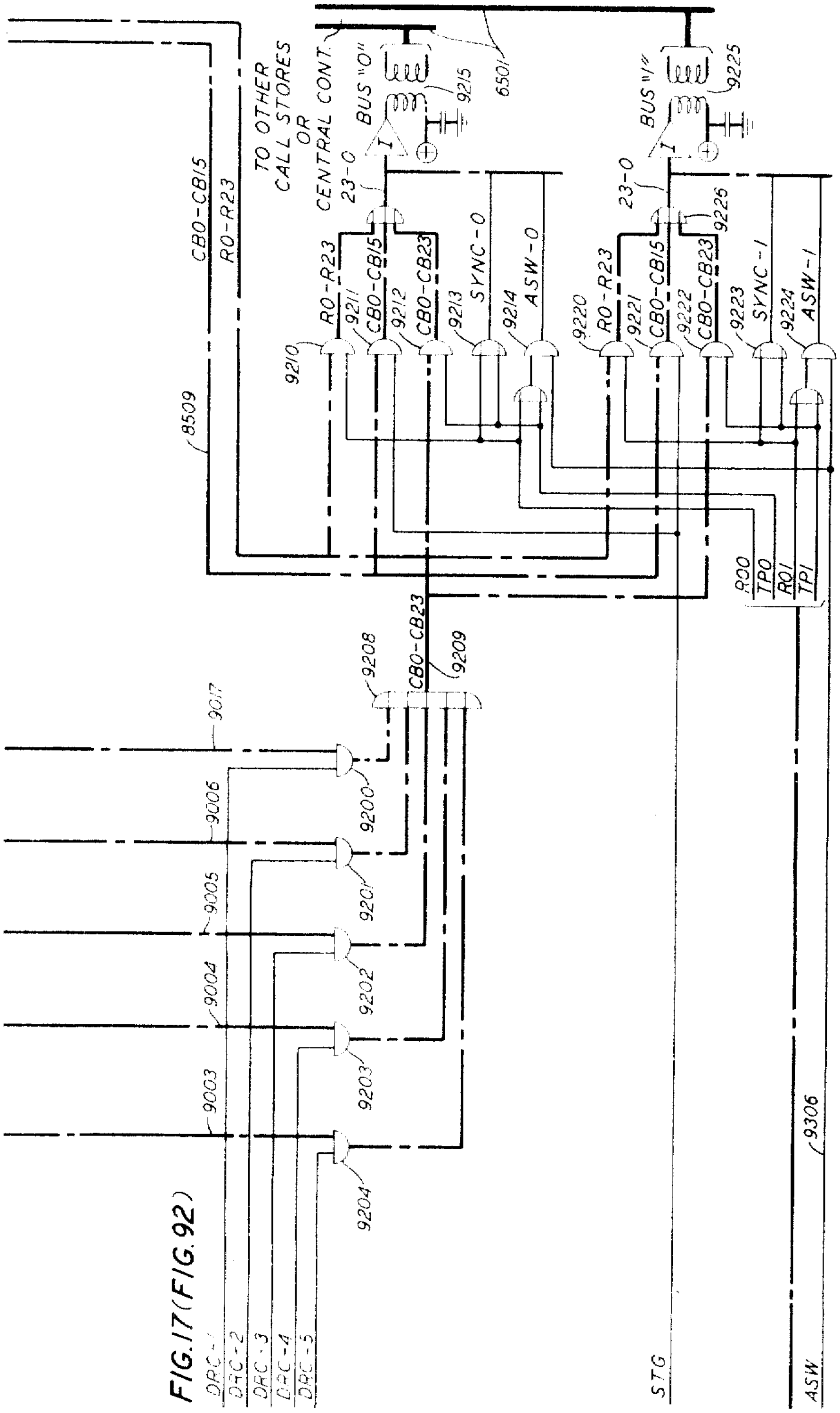
FIG.17 (FIG.92)

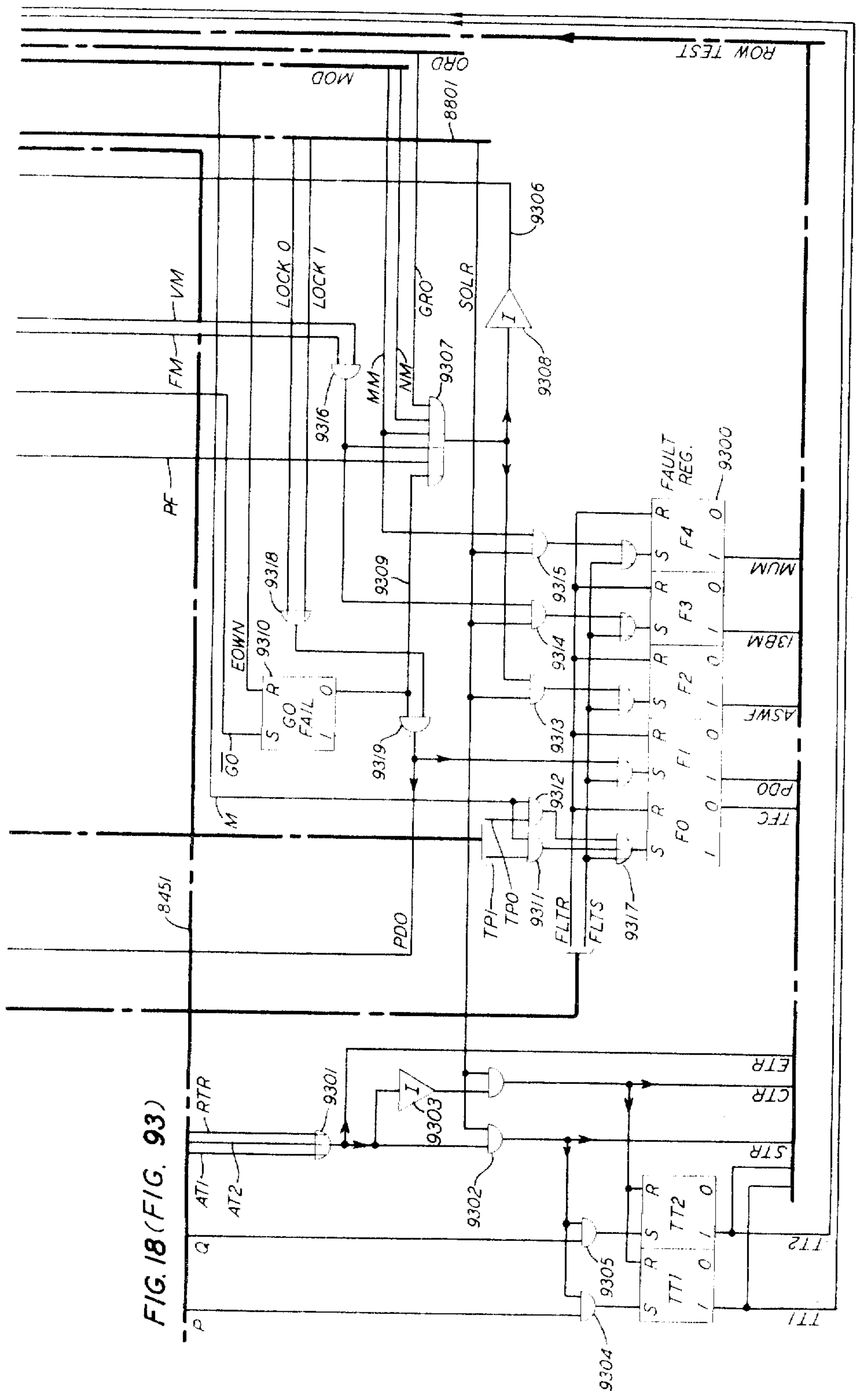
FIG. 18 (FIG. 93)

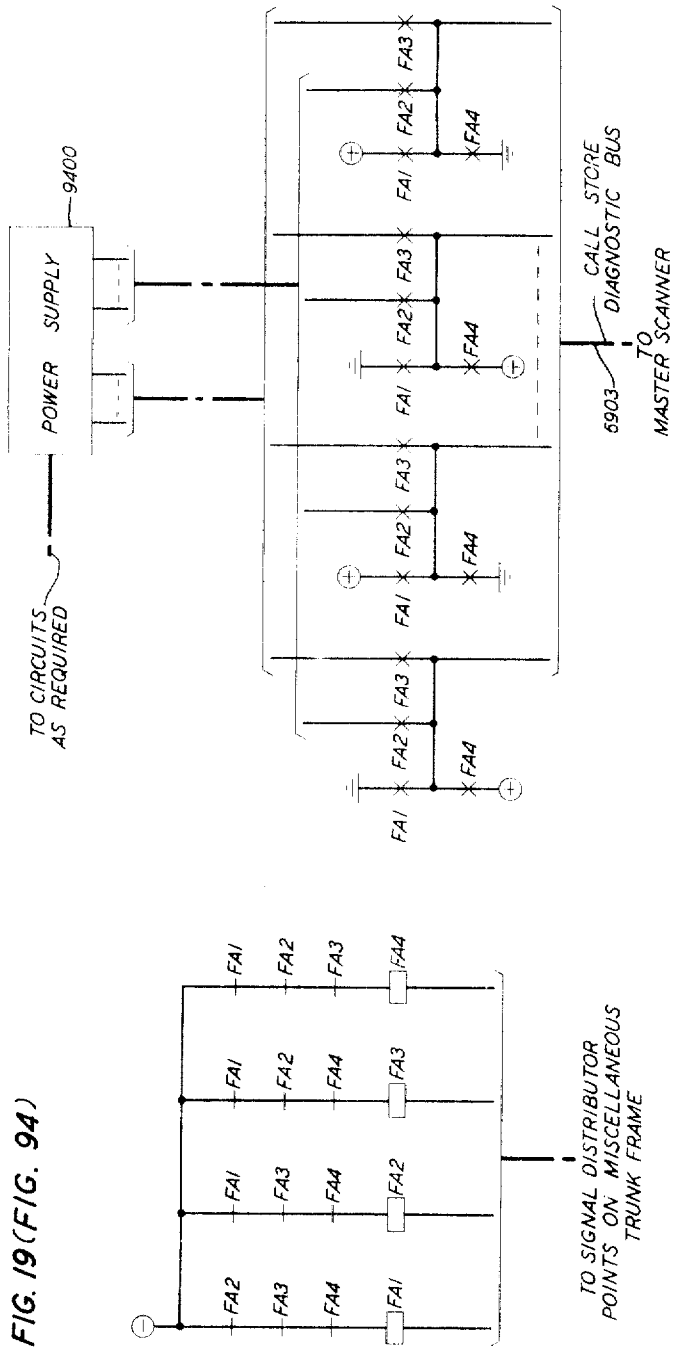
FIG. 19 (FIG. 94)

FIG. 20 (FIG. 133)
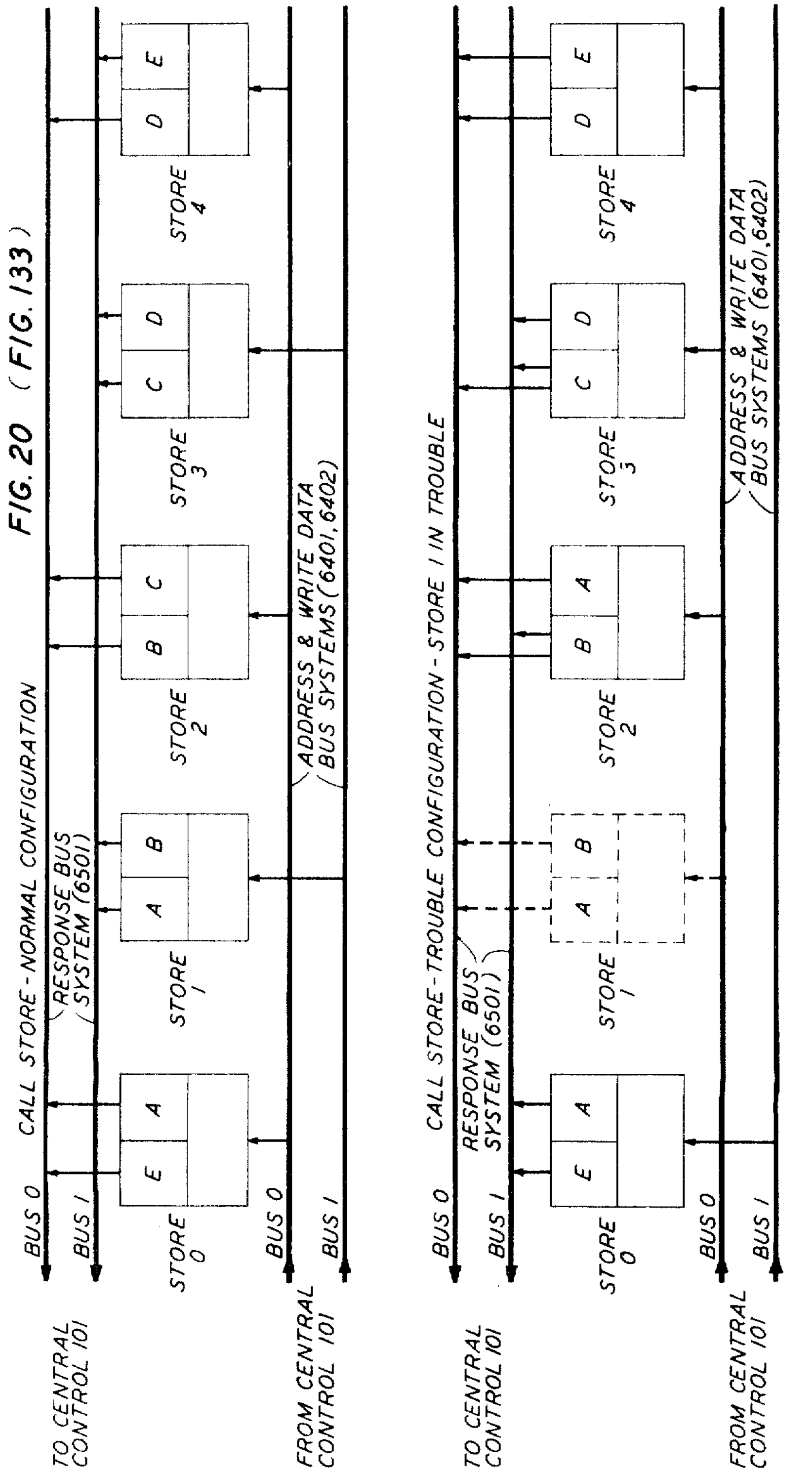

United States Patent Office 3,312,947
Patented Apr. 4, 1967

3,312,947

PLURAL MEMORY SYSTEM WITH INTERNAL MEMORY TRANSFER AND DUPLICATED INFORMATION

Matthew Raspanti, Lincroft, N.J., assignor to Bell Telephone Laboratories, Incorporated, New York, N.Y., a corporation of New York
Filed Dec. 31, 1963, Ser. No. 334,725
14 Claims. (Cl. 340—172.5)

Figure 1:
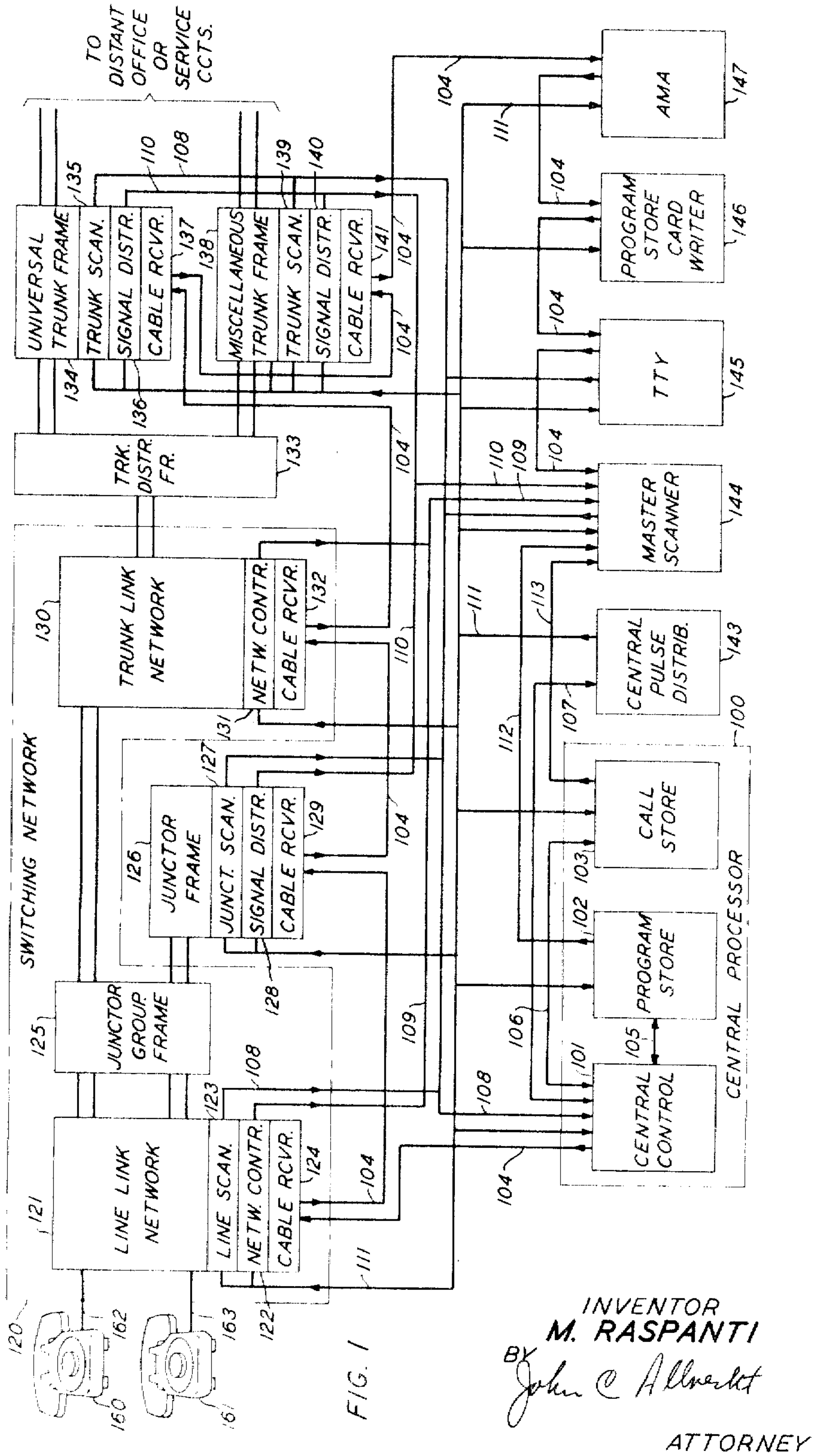

This invention relates to bulk memory arrangements employed in data handling systems, such as telephone switching systems.

Telephone switching systems which employ high capacity bulk memories are disclosed in U.S. Patent 2,955,165 of W. A. Budlong, G. G. Drew and J. A. Harr which issued on October 4, 1960 and in the copending application of A. H. Doblmaier, R. W. Downing, M. P. Fabisch, J. A. Harr, H. F. May, J. S. Nowak, F. F. Taylor and W. Ulrich, Serial No. 334,875, filed December 31, 1963. In these systems a central processor, which comprises a central control, a permanent bulk memory and a temporary bulk memory, performs the system call processing and maintenance functions principally on the basis of information stored in the bulk memories.

Advances in high speed data processing facilities, including bulk memories, have led to increased sharing of such facilities. For example, in the above noted system of Doblmaier et al., a single central processor performs the telephone and maintenance functions of a telephone switching systems serving thousands of subscribers. Thus, failure of the central processor to perform properly has a substantial impact on system performance.

Telephone subscriber satisfaction is based upon consistent and uninterrupted telephone service. Thus, a measure of subscriber satisfaction is the "system dependability." System dependability requires that even though the central processor system may experience both component and subsystem failures, the existence of these failures is not reflected in the service which is rendered to a subscriber. System dependability is enhanced by:

(1) Checks to assure early detection of potential trouble;

(2) Subsystem duplication with means for rapidly removing faulty subsystems from the active combination of equipments; and rearranging the available subsystem to acquire a workable active combination of equipments;

(3) Means to rapidly diagnose and repair the defect thus assuring the early availability of the subsystem which has experienced trouble.

Recent developments have led to increased memory capacity within a single memory unit; however, in telephone systems there are practical limits to the size of such memory units. For example, the memory requirements of an electronic telephone system are a direct function of the call handling capacity of the system. Therefore, economic considerations require that the information capacity of a memory unit be related to the memory requirements of an average sized telephone switching system and that the memory configuration lend itself to easy growth to meet the memory requirements of larger telephone switching systems.

Accordingly, it is an object of this invention to more fully utilize the information capacity of bulk memories in telephone switching systems.

It is another object of this invention to rapidly switch a faulty memory unit from the active combination of equipments.

It is another object of this invention to continually observe the performance of a memory to detect faulty operation.

It is another object of this invention to increase the flexibility of control circuits for bulk memories to permit the rapid rearrangement of information in such memories.

It is another object of this invention to improve the reliability of telephone switching systems through improved memory testing techniques.

It is another object of this invention to operate a memory unit with duplicate input and output bus systems and to effectively isolate both of these bus systems and the memory unit from trouble which occurs in either one of the bus systems or in the memory unit.

These and other objects of this invention are achieved in one specific illustrative embodiment wherein each memory unit comprises flexible control and maintainance circuitry which provides access to both the memory proper and to pluralities of test points within the control circuits and the memory access circuits through the use of a single command format.

In accordance with this invention the memory capacity of a memory unit is divided into two portions conveniently referred to herein as the left or H portion and the right of G portion. A memory system of a telephone switching system, whether it be the semipermanent memory or the temporary memory, always comprises at least two memory units to enhance system dependability through duplication. In systems, other than those serving fewer than 10,000 subscribers, three or more memory units make up the semipermanent memory system and the temporary memory system. For example, although a small office may require only a pair of temporary memories, a large office in the order of 50,000 lines may require as many as thirty-six temporary memory units.

In accordance with a feature of this invention, a duplicated memory system may comprise any integral number of basic memory units and memory system growth may be achieved through the addition of one or more memory units. Although the information contained in a memory system is fully duplicated, the memory units are not related in pairs and the information stored in one memory is not fully duplicated in a second or standby memory. Instead, the information contained in the right half of a first memory is also contained in the left half of a second memory; the information in the right half of the second memory is contained in the left half of a third memory and so forth until the information contained in the right half of the last memory is duplicated in the left half of the first memory.

In accordance with another feature of this invention, information stored in a temporary memory system may be readily rearranged. In accordance with this one specific illustrative embodiment, memory capacity of the left or H portion of a memory unit is associated with a fixed information block code name which is employed in providing access to the left portion information capacity both for reading and for writing. Access to the information capacity of the second portion of a memory unit is by way of a variable code name. The variable code name may be changed by commands from the central control of the telephone switching system. Thus, a block of information may be moved from one memory unit to another memory unit while retaining the coded name associated with that block.

In accordance with another feature of this invention, substantial hardware checks are performed on the operation of the memory unit in response to a received command and these hardware checks are summarized as indicating acceptable memory unit performance through the transmission of an operational check signal which is returned to the central control upon completion of a command operation.

The above and other features of this invention may be more readily understood when read with respect to the accompanying drawing in which:

FIG. 1 is a block diagram of a telephone switching system in which my invention may be employed;

FIGS. 2 through 7 correspond to FIGS. 64 through 69 of Doblmaier et al. and show the various communication paths serving a Call Store System 103.

FIGS. 8 through 19 correspond to FIGS. 83 through 94 of Doblmaier et al. and are a schematic representation of one illustrative embodiment of my invention; and FIG. 20 corresponds to FIG. 133 of Doblmaier et al. and shows the arrangement of information within the memory units of a memory unit system and the association of the memory units with the duplicate input and output bus systems.

FIGS. 21 (137) and 22 (139) are key sheets showing the arrangement of portions of my system as enumerated above.

The figures of the drawing are numbered consecutively and also numbered in parentheses and labeled in accordance with the numbers and labels employed on corresponding figures of the Doblmaier et al application. Use of the same figures in these two copending applications permits a better understanding of the applicability of my invention to that system. The various apparatuses are identified by a reference character, the first part of which indicates the Doblmaier et al. drawing on which the apparatus appears. To prevent overcrowding of the drawing these first parts may not be present in the drawing.

The principal divisions of the electronic telephone switching system disclosed in the previously mentioned copending application of Doblmaier et al. are shown in FIG. 1. The functional designations employed therein are broadly descriptive of the task assigned each block of the figure. It may be seen from FIG. 1 that the central processor comprises the Central Control 101, a Program Store (semipermanent memory) 102, and a Call Store (temporary memory) 103. The program store contains the system instructions and certain slow changing system data while the call store contains system data which must be readily changed.

Information may be read from the call store at system cycle speed (5.5 microseconds per cycle) and, also, new information may be written into the call store at this same rate. Accordingly, the call store is employed to store the more volatile system information.

Certain of the measures disclosed herein are applicable only to call store memory units. However, most measures apply both to the call store memory units and to the program store memory units. These measures are described herein with respect to the call store system without specific reference to their applicability to the program store system.

In this one illustrative embodiment, the Call Store System 103 comprises a plurality of independent call stores. Each call store is a random access bulk memory comprising a ferrite sheet memory and the attendant control, access, readout and writing circuitry, and maintenance circuitry. In this one illustrative embodiment, each call store memory unit has the capacity to store 8,192 twenty-four bit words at a like number of discrete information addresses.

The Call Store System 103 comprises at least two call stores to meet system reliability requirements and a call store system may comprise any integral number of stores from two to the encoding capacity of the six bit code comprising bits K0–K5.

The information capacity of a Call Store 103 is divided in half; one half of the information capacity is designated the left or H half and the other half of the information capacity is designated the right or G half.

In order to permit utilization of odd numbers of call stores within a Call Store System 103 and still retain complete duplication of information in the store system in the absence of system trouble, the information is duplicated in the pattern shown in the upper portion of FIG. 20 (133). The information "A" which is stored in the right half of the "0" store is duplicated in the left half of the "1" store. Similarly, the information "B" in the right half of the "1" store is duplicated in the left half of the "2" store, et cetera. Similarly, the information "E" which is stored in the right half of the "4" store (which is the last store of the illustrative system shown) is duplicated in the left half of the "0" store.

Information is retrieved from the call store system by a command from the Central Control 101 designating among other things an information block code name and an address designating a location of the desired information word within the designated information block. Similarly, information is written into the Call Store System 103 by a command from the Central Control 101 designating an information block code name, an address designating the location which is to receive the data and the coded data that is to be written into the designated information location.

Each information block is assigned a discrete code name and since, in the absence of system trouble, a block of information is duplicated in two stores, the two stores wherein this information is located are both arranged to respond to the information block code name. In the case of the Call Store 103 it is possible in the event of failure of one or more stores of the store system to rearrange information to assure duplication of certain important information. That is, certain of the information in the Call Store 103 is of greater relative importance than other information; therefore, in the event of a failure of a call store within the Call Store System 103, it is desirable to rearrange the information in order to duplicate the more important information at the expense of losing duplication of the less important information. Accordingly, although each call store memory unit must respond to two information block code names, only one of the code names is permanently associated with a particular call store unit, namely, the code name of the information stored in the left half of the memory. The code name associated with the information capacity of the right half of a Call Store 103 may be changed as explained later herein and thus is termed the variable code name.

Communication Bus System 106 comprising the Address and Control buses 6401, the Data buses 6402, and the Response buses 6501 which are private to the Central Control 101 and the Call Store 103 are employed respectively to transmit commands from the Central Control 101 to the Call Store 103; to transmit write data from the Central Control 101 to the Call Store 103; and to transmit responses from the Call Store 103 back to the Central Control 101. In addition to these three private communication paths each call store of the Call Store System 103 also receives information from the Central Control 101 via output signals of the Central Pulse Distributor 143.

An understanding of these private bus systems may be achieved through FIGS. 2(64) through 7(69). As seen in FIGS. 2(64) and 3(65) the Central Control System 101 comprising 64CC1 and 64CC2 is connected to the Call Store System 103 comprising 65CS1 through 65CSN via the Call Store Address Bus System 6401. The Call Store Address Bus System 6401 comprises two buses designated "0" and "1" and each bus comprises twenty-six conductor pairs. These buses may be energized from either of the central controls 64CC1 and 64CC2 and the output circuits of 64CC1 and 64CC2 are connected to the individual pairs of the Bus System 6401 in parallel. Central Controls 64CC1 and 64CC2 may selectively transmit to the Call Store System 103 via the bus "0," the bus "1" or via both the "0" and the "1" of the Call Store Address Bus System 6401. The Call Store Address Bus System 6401 is coupled by way of serially connected transformers to receiving circuitry in each of the call stores 65CS1 through 65CSN.

As seen in FIGS. 2(64) and 3(65), the Call Store Write Data Bus System 6402 comprises two buses termed "0" and "1" and each bus comprises twenty-five conductor pairs. The buses are selectively driven in parallel by cable drivers in each of the central controls 64CC1 and 64CC2 and these buses are coupled by way of serially connected transformers to receiving circuitry in each of the call stores 65CS1 through 65CSN.

The Call Store Response Bus System 6501 comprises two buses "0" and "1" and each bus comprises twenty-six conductor pairs. The buses are driven in parallel by cable drivers in each of the plurality of call stores 65CS1 through 65CSN and these buses are coupled by way of serially connected transformers to receiving circuitry in each of the central controls 64CC1 and 64CC2.

The significance of the information transmitted from the Central Control 101 to the Call Store System 103 via the Call Store Address Bus System 6401, the Write Data Bus System 6402, and the Call Store Response Bus System 6501 is set forth later herein.

*Call Store-Bus Configurations*

In the telephone switching system of Doblmaier et al. the Central Control 101 comprises duplicate central controls which during normal operation are designated the active central control and the standby central control. In the most usual mode of operation the two central controls are operated in step, that is, both central controls are simultaneously processing the same information. In this mode of operation the active central control is assigned a particular bus of each of the bus systems while the standby central control is assigned the other bus of each of the bus systems. A normal call store configuration which may be employed in the absence of trouble in any of the call stores or in any of the bus systems is shown in the upper portion of FIG. 20(133). In this normal configuration it is assumed that the active central control (not shown) is operating with bus "0" of both the Address Bus System 6401 and of the Write Data Bus System 6402. Similarly, the active central control is operating with bus "0" of the Response Bus System 6501.

The standby central control then is operating with the "1" bus of the Address Bus System 6401, the "1" bus of the Write Data Bus System 6402, and the "1" bus of the Response Bus System 6501. In FIG. 20(133) it is seen that the information blocks A through E are duplicated as set forth earlier herein and that the stores which are addressed by the active bus (bus "0") contain one copy of the information blocks A through D and two copies of the information block E. The stores which may be addressed via the standby bus contain copies of the information blocks A through D, however, they do not contain a copy of information block E. Accordingly, where the call store system comprises an odd number of store units, the standby central control may independently read information from all information blocks save one. The active central control may read information from all information blocks and, in fact, is capable of reading information from two copies of the information block which cannot be reached independently by the standby central control.

The number of call store-bus configurations which may be employed in the presence of trouble in one of the buses of the various bus systems or in particular call store units is very large; therefore, only one illustrative example of a trouble configuration is shown herein. If store 1 is in trouble, the trouble configuration shown in the lower portion of FIG. 20(133) may be employed. Assuming that the information in block A is of greater importance to continued system operation than the information in blocks B and C, the trouble configuration shown serves to provide a duplicate copy of information block A while providing only single copies of information blocks B and C. As seen from the trouble configuration of FIG. 20(133), stores 2, 3, and 4 may be reached from the active bus "0" and in this configuration the active central control may read information from any one of the information blocks A through E and, in fact, information block D is duplicated within these three stores. The standby central control has independent access only to the contents of store 0, namely, information blocks A through E. However, whenever the active central control addresses stores 2, 3, and 4, the information blocks to which the standby central control does not have independent access are read to the standby central control via bus "1" of the Response Bus System 6501. That is, even though the standby central control cannot independently read information from all information blocks, continued in-step operation of the two central controls is possible since commands of the active central control serve to return the appropriate call store responses both to the active central control and to the standby central control. The standby central control may continue to generate commands and transmit them via its associated address and write data bus; however, because of the setting of the various flip-flops within the call stores, certain commands transmitted over these buses are not effective to read a store.

*Call Store Modes*

A call store may be operated in any one of the following five modes:

(1) *Normal Read and Write Mode.*—In this mode of operation, Central Control 101 by way of a Call Store Command defines an address location in a particular block of store information and requests that the information found at this address be transmitted to Central Control 101 or that particular data be written in the defined location. Each block of duplicated information is assigned a code name in the six bit code. Accordingly, two call stores which have duplicate information stored therein will respond to a single code name.

(2) *The H (left) Maintenance Read and Write Mode.*—In this mode of operation Central Control 101 defines an address in a particular block of store information and only the store whose fixed name code corresponds to the transmitted code name will respond to the command. As in the normal mode, information may be read from the store or data may be written into the store.

(3) *The G (right) Maintenance Read and Write Mode.*—In this mode of operation Central Control 101 defines an address in a particular block of information in the right or G half of a Call Store 103; however, the Call Store 103 is addressed by means of the fixed code name, i.e., the name associated with the block of information in the H or left half of the store.

In each of the above read modes of operation the addressed information location is regenerated.

(4) *Read Control Mode.*—In this mode, status information in binary form relating to a number of test points is transmitted from a Call Store 103 to Central Control 101 via the Call Store Response Bus System 6501. The test points are arranged in groups called rows and the information comprising a particular row may be selectively designated in the command from Central Control 101.

(5) *Write Control Mode.*—This mode permits Central Control 101, for purposes of rearranging data within the store and for purposes of trouble diagnosis, to selectively write information into various elements of the Call Store System 103. For example, in the course of rearranging information in the store this mode permits Central Control 101 to selectively set or reset the flip-flops N0 through N5 of the Variable Name Register 9100 and the flip-flops 91HS0, 91HS1, 91GS0 and 91GS1 of the Routing Register 9101, shown in FIG. 16 (91). Also in the course of trouble diagnosis these and other flip-flops within the call store control circuitry may be selectively set or reset in order to check their operation through subsequent read control mode commands. It should be noted that it is not possible to write into all of the flip-flops of the store in this mode of operation and, further, that there are not flip-flops associated with all of the test points which may be read under the read control mode.

The Call Store System 103 is passive in the absence of commands from Central Control 101.

There are seven control flip-flops in each Call Store 103 which are provided to control the inputs from the buses and the outputs to the buses. Certain of these flip-flops are set or reset by output signals from the Central Pulse Distributor 143, while others are set or reset by operating the Call Store 103 in the write control mode. A table of these flip-flops, the source of information for setting or resetting the flip-flop, and the significance of the flip-flop being set or reset is set forth below.

ROUTING FLIP-FLOP SETTING SOURCE AND SIGNIFICANCE

| Flip-Flop | Set and Reset By | Significance |
|---|---|---|
| 84R0 | CPD | Set—Receive from bus "0". Send maintenance and control readouts on bus "0". Reset—Receive from bus "1". Send maintenance and control readouts on bus "1". |
| 91HS0 | Write Control | Set—Send normal readouts from H side on bus "0". |
| 91HS1 | Write Control | Set—Send normal readouts from H side on bus "1". |
| 91GS0 | Write Control | Set—Send normal readouts from G side on bus "0". |
| 91GS1 | Write Control | Set—Send normal readouts from G side on bus "1". |
| 84TBL0 | CPD | Set—Inhibit operation with bus "0" (both receive and send). |
| 84TBL1 | CPD | Set—Inhibit operation with bus "1" (both receive and send). |

These flip-flops are manipulated by the Central Control 101 to obtain desired store bus configurations not only during times when all stores and all bus systems are operating properly, but also during times when trouble is encountered and either the facilities of a bus or a particular store are not available.

The set and reset signals for the central pulse distributor controlled flip-flops 84R0, 84TBL0 and 84TBL1 are received over the Bipolar Cable 6700 which is shown in FIG. 11(86). There is one other bipolar signal which is applied to the Call Store 103 and this is employed to selectively set or reset the flip-flops of the Fault Register 9300. The operation of the Fault Register 3900 is described later herein.

The bipolar signals are brought into the Call Store 103 via individual cable pairs of the Bipolar Cable 6700 and they each terminate in a transformer such as 8600. The transformer 8600 is connected to provide an input signal to a first amplifier such as 8601 for a signal of a first polarity, i.e., a set signal and to provide an input signal to another amplifier such as 8602 in response to an input signal of the opposite polarity, i.e., a reset signal. A security signal termed herein a WRMI gating pulse accompanies each bipolar signal. WRMI signals are transmitted from the Central Pulse Distributor 143 to the various locations throughout the system via the WRMI Bus System 6701. This bus system comprises a first cable pair which is labeled bus "0" and a second cable pair which is labeled bus "1." As shown in FIG. 11 (86), a WRMI signal on bus "0" is transmitted through transformer 8603, amplifier 8604 and OR gate 8605 to provide gating signals to the AND gates 8606 and 8607. Similarly, a WRMI signal on bus "1" is transmitted through transformer 8608, amplifier 8609, and OR gate 8605.

Separate set and reset signals are provided to the flip-flops 84R0, 84TBL0 and 84TBL1 via cable 8610.

With the above background information we may now proceed to the operation of a Call Store 103 as shown in FIGS. 8(83) through 19(94) under the influence of a number of operating conditions.

The connection of the address buses to a Call Store 103 is shown in FIG. 8(83). In accordance with the symbology used throughout the drawing the transformer 8300 and the amplifier 8302 are representative of a plurality of transformers and amplifiers, respectively; the number of transformers and amplifiers represented being equal in number to the number of address and control bits of information which are found in the "0" bus of the Address and Control Bus System 6401. The "0" bus, like the "1" bus as shown in FIG. 2(64), comprises twenty-six bits as follows:

(A) 12 address bits A0–A11
(B) 6 code bits K0–K5
(C) 3 mode bits HM, GM, CM
(D) synchronizing bit S1
(E) 2 order bits R, W
(F) 1 parity bit
(G) synchronizing bit S2

As previously noted, each call store ferrite sheet memory comprises 8,192 discrete information word addresses. The 8,192 address locations of a call store memory are arranged in a minimum noise wiring pattern which is not disclosed herein. The individual word memory locations, however, may be defined for purposes of reading or changing the information at the desired location by means of a twelve-bit binary address in conjunction with code bits K0–K5.

There are two identical groups each comprising sixty-four Y or horizontal drive lines associated with a call store memory and there are also two identical groups of X or vertical access drive lines of sixty-four wires each in each call store. This arrangement thus permits access to 2×64×64 or 8,192 word locations within a call store. As noted earlier herein, a twelve-bit binary address comprising bits A1 through A11 is transmitted from the Central Control 101 to the Call Store 103 and, as is well known, twelve bits are necessary and sufficient to define 4,096 discrete locations. The additional bit of information required to define 8,192 locations is derived by the Code and Mode Decoder 8700. The fixed name code is always associated with the H or left half of a call store; therefore, if the Cross-Connect Field 8701 is arranged to cause the Code and Mode Decoder 8700 to respond to the incoming name code, and if the memory is operating in the normal mode, the command is of necessity directed to reading or writing information in a memory location which is in the left half of the store. However, if the command is to a call store which has the block of information bearing the identifying code name stored in the Variable Name Register 9100, then the Code and Mode Decoder 8700 will receive a variable address match signal on conductor VADM which is the output signal of the Variable Address Matcher 8703. Conductors 13H and 13G of the Code and Mode Decoder 8700 are enabled when information is to be read from the left or right side of the memory, respectively. Conductors 13G and 13H are input signals to both the X access and the Y access circuitry of FIG. 10(85). It would be possible to employ the 13G and 13H conductors only in the X access circuitry in order to define the left or right half of the memory unit; however, as a measure to minimize noise within the call store, separate X and Y access conductors are provided for the H and G halves of the memory and there conductors are selectively energized.

The reading of information from a ferrite sheet memory is destructive; therefore each reading command includes a regenerate function. In the subject call store the reading of the memory at a bit location wherein there is stored a "0" will result in no output signal, while the reading of a bit location wherein there is stored a "1" results in an output signal.

Pulses on the five leads HM, GM, CM, R and W, in conductor groups 8327 and 8328, specify the mode of operation of the store as follows:

| HM | GM | CM | R | W | Mode |
|---|---|---|---|---|---|
| 0 | 0 | 0 | 1 | 0 | Normal Read. |
| 0 | 0 | 0 | 0 | 1 | Normal Write. |
| 0 | 1 | 1 | 1 | 0 | H Maintenance Read. |
| 0 | 1 | 1 | 0 | 1 | H Maintenance Write. |
| 1 | 0 | 1 | 1 | 0 | G Maintenance Read. |
| 1 | 0 | 1 | 0 | 1 | G Maintenance Write. |
| 1 | 1 | 0 | 0 | 0 | Control Read. |
| 1 | 1 | 0 | 1 | 0 | Control Read. |
| 1 | 1 | 0 | 1 | 1 | Control Read. |
| 1 | 1 | 0 | 0 | 1 | Control Write. |

A first synchronizing signal labeled "Sync 1" accompanies the address, code and mode bits and a second synchronizing signal labeled "Sync 2" accompanies the read, write and address parity information. The utilization of the read and write information is set forth in the table above and it should be noted that information on the R and W conductors and the AP conductor of the Call Store Address and Control Bus System 6401 is gated through an AND gate such as 8316 or 8317, OR gate 8324, and cable 8328 to the R, W, and AP flip-flops of the Order and Parity Register 8900.

As will be described later herein with respect to a memory write order, the data to be written at a defined word location is transmitted from Central Control 101 to the Call Store 103 via the Call Store Write Data Bus System 6402 and, as will be described more fully later herein, this information is gated to the Data Register 9000. Similarly, when the store is operated in the write control mode the information received over the Call Store Write Data Bus 6402 is gated on a 2-rail basis to the various locations within the call store control circuitry which are to be selectively set or reset by the write control order.

*Normal Mode*

In the normal mode of operation, information may be read from a specified location in the memory or a new data word which is obtained from Central Control 101 may be written into a specified location. A normal mode read operation is, in effect, a command to read and regenerate the memory at a specified location, while a normal mode write operation is a command to erase and write new data in the memory. Assume that the system is operating in the absence of trouble and that the trouble flip-flops 84TBL0 and 84TBL1 are both reset and that commands for the store under discussion are to be received over the "1" bus of the Address and Control Bus System 6401 and over the "1" bus of the Call Store Write Data Bus System 6402. Accordingly, the routing flip-flop 84RO is reset to the "0" state by a prior bipolar signal from the Central Pulse Distributor 143.

Operation of the call store is asychronous with respect to operation of the Central Control 101. Actions within the call store are initiated by the receipt of a command from the Central Control 101. The Timer Circuit 8800 *is not described* in detail herein. The actions of the Timer Circuit 8800 are initiated by a synchronizing signal which accompanies the central control commands. The timer circuit has a basic 5.5 microsecond operating interval and operations within the call store are sequenced by means of pulses which occur at appropriate intervals throughout the 5.5 microsecond operating cycle.

A normal mode read command from the Central Control 101 to the Call Store 103 comprises parallel signals on the conductors of the Call Store Address and Control Buses 8350 and 8351 of the Address and Control Bus System 6401.

The command information which is transmitted from Central Control 101 to the Call Store 103 is transmitted in two waves in the case of a normal or maintenance read operation and in three waves in the case of a normal or maintenance write operation. The first wave of information comprises:

(A) Six code bits K0 through K5 which define the block of information from which the desired word is to be read;

(B) Twelve address bits which, together with the above-noted code bits, fully define the location of the desired word within the store;

(C) Bits which define the mode of operation, i.e., normal, maintenance or control desired; and (D) The Sync 1 synchronizing bit from the Central Control 101.

The second wave of information comprises the address parity bit, the read and write order bits, and the second synchronizing signal. The second wave of information of a single command follows the first wave by approximately one-half microsecond.

The third wave of information is employed only in the case of a write command and it follows the second wave of information by a nominal two microseconds. The third wave of information comprises twenty-three data bits, data parity, and a third synchronizing bit.

With the flip-flops 89TBL0, 89TBL1, and 89R0 all in the reset state the store will respond to command information from the Central Control 101 on the "1" bus 8351 of the Address and Control Bus System 6401 and to information on the "1" data bus 8651 of the Call Store Write Data Bus System 6402.

Under these conditions the first wave of information of a command from the Central Control 101 will be transmitted in parallel through AND gates such as 8309, 8311, 8313 and 8315 at the time set by the first synchronizing signal on the lead labeled "Sync 1." The gates 8309, 8311, 8313 and 8315 are partially enabled by an output signal of the AND gate 8305 which has as its input conductors the $\overline{RO}$ conductor and the $\overline{TBL1A}$ conductor; conductor $\overline{RO}$ being the "0" output conductor of the flip-flop 84RO and $\overline{TBL1A}$ being the output conductor of the AND gate 8401. AND gate 8401 combines the "0" output conductor $\overline{TBL1}$ of the flip-flop 84TBL1 and the lockout conductor L01 which is the output conductor of the Timer 8800. The lockout conductor L01 enables the AND gate 8401 to permit receipt of the address and control information through the AND gates such as 8309, 8311, 8313, and 8315; however, one-half microsecond after the first synchronizing signal has been received and a start signal has been transmitted via AND gate 8315 and OR gate 8323 to the Timer Circuit 8800 the lockout conductor L01 will be disabled until the end of the normal 5.5 microsecond call store signal. In the event that commands are being received over the "0" bus 8350, the AND gates 8402 and 8304 will be employed in gating information through the AND gates 8308, 8310, 8312, and 8314 and these gates will be disabled when the Timer Circuit 8800 removes enablement from the L00 lockout conductor.

The information which is received in the first wave of the command is distributed as follows:

(A) The twelve bit address comprising A0 through A11 which is received through a plurality of AND gates such as 8309 and OR gates 8320 is transmitted via conductor group 8325 to the Address Register 8400. The Address Register 8400 is reset at the end of each normal store timing cycle; therefore, information is transmitted via conductor group 8325 on a single rail basis. The contents of the Address Register 8400 are employed as follows:

(1) As part of the address for both the X Access Circuitry 8501 and the Y Access Circuitry 8502.

(2) Bits A0 through A3 comprise input signals to the Control Address Decoder 8403. The control address decoder is employed in the control mode of operation and will be described with respect thereto.

(3) Bits A5 and A11 are employed as input signals to the Timer Circuit 8800. As will be seen with respect to the reading of information from the Ferrite Sheet Memory 8500, the A5 and A11 bits of the Y and X address determine which group of readout amplifiers are used.

(4) Bits A0 through A11 are input signals to the Parity Check Circuit 8901.

(B) The six-bit code comprising bits K0 through K5 are transmitted through AND gate 8311, OR gate 8321, conductor group 8326 to the set terminals of the Code Register 8705. As in the case of the address register, the Code Register 8705 and the Mode Register 8704 are both reset by timer output signals at the end of the normal 5.5 microsecond call store cycle. The output conductors of the Code Register 8705 comprise input signals to the Cross-Connect Field 8701 and to the Variable Address Matcher 8703. The Cross-Connect Field 8701 comprises six pairs of input terminals and six output terminals. The six output terminals of the Cross-Connect Field 8701 comprise input conductors to the AND gate 8706. The output terminals 1 through 6 are selectively cross connected in accordance with the fixed code name of the store to six of the input terminals K0 through K5. If the code name in the Code Register 8705 agrees with the wiring pattern in the Cross-Connect Field 8701, the AND gate 8706 will be enabled and a signal will appear on the fixed address match conductor FADM. If the code name in the Code Register 8705 agrees with the code name in the Variable Name Register 9100, the Variable Address Matcher 8703 will be enabled and an output signal will appear on the variable address match conductor VADM.

(C) The mode bits CM, GM, and HM are transmitted through an AND gate such as 8313, and OR gate such as 8322, and conductor group 8327 to the set terminals of the Mode Register 8704. The "0" output conductors, namely, $\overline{C}$, $\overline{G}$, and $\overline{H}$ of the flip-flops of the Mode Register 8704 comprise the inputs to AND gate 8702, the output of which is an enable signal to the variable Address Matcher 8703. The call store must respond only to its fixed name code when the store is operated in the control mode or in either of the maintenance modes; therefore, if one of the flip-flops of the Mode Register 8704 is enabled to indicate a command for a mode other than normal, then AND gate 8702 will become disabled and, therefore, the Variable Address Matcher 8703 will be disabled.

(D) The Sync 1 signal is transmitted through AND gate 8315, OR gate 8323, the Start conductor, and the timer input cable 8810. A pulse on the Start conductor initiates the operation of the Timer Circuit 8800.

The information which arrives in the second wave of the command approximately one-half microsecond after the first wave of information is distributed through the system as follows:

(A) The address parity conductor AP, the read conductor R, and the write conductor W are input conductors to AND gates such as 8317, and information on these conductors is transmitted therethrough and then via OR gates such as 8324 and cable 8328 to the Order and Parity Register 8900. The setting of the read and write flip-flops R and W of the Order and Parity Register 8900 is employed in all modes of operation to define whether a read operation or a write operation is ordered and the address parity flip-flop 89AP of the Order and Parity Register 8900 serves to store the partiy bit which arrives over the AP conductor. The output conductors of the AP flip-flop are also input signals to the Parity Check Circuit 8901 and complete the input information thereto. The output conductors of the R and W flip-flops are input signals to the Order Decoder 8902 and also are connected to the row test circuitry.

(B) The Sync 2 signal is transmitted through AND gate 8319 and provides a lock "1" input signal to the Timer Circuit 8800. That is, upon receipt of a Sync 2 signal the Timer Circuit 8800 removes the enabling signal L01 from the AND gate 8401 and thus inhibits the receipt of further information from the "1" address and control bus until such time as the Timer 8800 has completed its 5.5 microsecond operating cycle.

In accordance with the received address comprising bits A0 through A11 and the supplementary address information, on conductors 13G and 13H, which is derived from the code bits K0 through K5 by means of the Code and Mode Decoder 8700, the X and Y access circuitry serves to drive the appropriate X and Y lines to interrogate the ferrite sheet memory at the desired word location. Timing signals for control of both the X and Y access circuits are derived from the Timer 8800.

As seen in FIG. 10 (85), there are two sets of readout amplifiers, namely, set A and set B. Each set comprises twenty-four readout amplifiers and both sets are connected to the discriminators such as 8503 and 8504. One set of readout amplifiers 8500A–8523A serves one-half of the word locations in the Ferrite Sheet Memory 8500, while the other set comprising 8500B–8523B serves the remaining word locations of the memory. Information obtained from the address word location in the Memory 8500 is transmitted through its appropriate set of readout amplifiers to the individual discriminators such as 8503 and 8504. The discriminators 8503 and 8504 each serve two readout amplifiers, namely, the readout amplifiers of groups A and B which serve corresponding bits of the memory word. For example, discriminator 8503 which serves the zero bit of information of the memory word receives input signals from the zero amplifier of both the A and B groups of readout amplifiers. The decision as to which amplifier output signal is gated through the discriminator is determined by the enablement of the timer output conductors UCA and UCB. A narrow strobe signal is a further output of the Timer Circuit 8800 and it serves to gate information through the discriminators such as 8503 and 8504 for transmission via conductors R0 through R23.

In the read mode of operation the information read from the memory is gated both to the Data Register 9016 and to a selected one or both of the buses of the Call Store Response Bus System 6501. The information on the discriminator output conductors R0 through R23 is gated to the individual stages of the Data Register 9016 via AND gates such as 9012 and 9013. This same information is gated to the appropriate bus or buses of the Call Store Response Bus System 6501. For example, if information is to be returned via the "1" bus, the information read from the memory will be transmitted through a plurality of AND gates such as 9200, OR gates such as 9226, and transformers such as 9225.

The information which is stored in the Data Register 9016 is employed in regenerating the information in the memory. That is, the output conductors of the individual stages of the Data Register 9016 comprise control leads to the Inhibit Current Drive Circuits such as 8506 and 8507. In the read mode of operation timing signals from the Timer 8800 will cause a writing of information into the addressed memory location in accordance with the contents of the Data Register 9016.

Each response to the Central Control 101 via the Call Store Response Bus System 6501 includes a signal on the All Seems Well conductor of the bus if the operational checks which are internal to the call store appear satisfactory. The All Seems Well signal is derived from the circuitry of FIG. 18 (93) and is transmitted via conductor 9306 to the All Seems Well Response AND gates 9224 and 9214. The All Seems Well AND gate 9224 is enabled by signals on either the RO1 conductor or the TP1 conductor. The RO1 conductor is enabled in normal and maintenance read modes of operation and the TP1 conductor is enabled in read control modes of operation. Similarly, AND gate 9214 is enabled by signals on either the RO0 conductor or the TP0 conductor.

A call store synchronizing signal also appears on the synchronizing conductor of the call store response bus of the Bus System 6501 in the case of all responses to Central Control 101 via the response bus system. The synchronizing signal for the "0" bus appears at the output of the OR gate 9213. The inputs to the OR gate 9213 comprise the RO0 conductor and the TP0 conductor and, in that these conductors control the gating of all other information to the "0" bus, the synchronizing signal is transmitted in parallel with other response information. Similarly, conductors RO1 and TP1 provide input signals to the OR gate 9223 and the output signal thereof is transmitted to Central Control 101 via the synchronizing conductor of bus "1" of the Call Store Response Bus System 6501.

*All Seems Well*

A signal on the All Seems Well conductor 9306 indicates that the control circuitry of the call store has passed certain checks which are made during each operating cycle of the call store. If central control fails to receive an All Seems Well signal it will first command a rereading of the call store at the previously addressed location and if the call store fails to transmit an All Seems Well after the reread operation, central control will undertake certain high priority actions to determine the possible cause of trouble and to make necessary rearrangements within the Call Store System 103 to bring the switching system back into operation in spite of any fault which may lie with a particular call store. The failure of an All Seems Well signal is a categorical statement that something appears to be wrong. To aid the central control in pin-pointing any possible trouble, certain types of failures cause individual stages of the Fault Register 9300 to be set. As seen in FIG. 18(93), the output conductors of the Fault Register 9300 are input conductors to the row test cable and, as seen in FIG. 15(90), these particular conductors comprise a portion of the conductors which go to make up conductor group 9003 and thus may be read to central control during a read control mode operation in which the conductor DRC–5 is enabled. The stages of the Fault Register 9300 may be collectively set or reset under the control of central pulse distributor bipolar signals to test the register. Such bipolar signals are accompanied by a WRMI signal and are gated through transformers such as 8600, amplifiers such as 8601 and 8602, AND gates 8606 and 8607, and conductor group 8610. All of the stages are set by a signal on the FLTS conductor and are reset by a signal on the FLTR conductor.

*Trouble Checks*

The OR gate 9307 has six input sources connected thereto. Signals from any one of these six sources indicates faulty response of the call store and thus serves to inhibit the generation of the All Seems Well signal. When the output of the OR gate 9307 is enabled the All Seems Well Failure Flip-Flop 93F2 will be set by the enablement of AND gate 9313 under the control of a signal conductor 93SOLR. This signal occurs approximately one microsecond after receipt of a command. The output of the OR gate 9307 is also connected to the input of the inverter 9308, the output of which is transmitted via conductor 9306 to the input terminals of the All Seems Well output AND gates 9214 and 9224. Thus, in the process of transmitting a response via either the "0" bus or the "1" bus of the Response Bus System 6501, the AND gates 9214 and 9224 will not be enabled if OR gate 9307 is enabled.

The Fault Register 9300, which includes the All Seems Well Flip-Flop 93F2, serves to record the source of a call store trouble. The Fault Register 9300 may be interrogated by the central control by means of a control read mode operation and thus central control is able to pinpoint the source of a call store operational failure.

Each of the inputs to the OR gate 9307 serve to indicate the occurrence of a different type of trouble within the call store. The first input is the "0" output conductor of the GO Fail Flip-Flop 9310. The GO Fail Flip-Flop 9310 in trouble free operation is in the "1" state except for a very short interval near the end of each call store response cycle. The GO output conductor of the Code and Mode Decoder 8700 is enabled upon the occurrence of a signal on either the fixed address match conductor 87FADM or the variable address match conductor 87VADM. The GO signal serves to initiate the timing sequence of the Timer 8800. Accordingly, the GO conductor is enabled when a code match occurs and it remains enabled until the Code Register 8705 is reset at the end of the timing cycle of the Timer 8800. In trouble free operation the GO conductor is disabled at the end of each response and this serves to enable the output of the inverter 9103 to set the GO Fail Flip-Flop to the "1" state. During the course of a call store operating cycle and prior to the time that the Code Register 8705 is reset a timer output signal will occur on conductor 93EOWN. This signal serves to reset the GO Fail Flip-Flop 9310. At the end of the cycle when the Code Register 8705 is reset the GO conductor will be disabled and the output signal of the inverter 9103 will serve to set the GO Fail Flip-Flop 9310 to its "1" state. If a trouble occurs which causes either the conductor 87FADM or the conductor 87VADM to become permanently enabled, the GO conductor will not be disabled at the end of a timing cycle and the GO Fail Flip-Flop will not be set. Steps must be taken to avoid a response from a call store encountering such trouble which is termed herein a "permanent decoder output" trouble.

The Lock "0" and the Lock "1" conductors, which are inputs to the OR gate 9318, are the output conductors of the receiving AND gates 8318 and 8319 and a signal on one of these conductors occurs at the time of the "Sync 2" pulse which is transmitted from Central Control 101 along with the address parity, the read and the write bits in the second wave of information in the course of transmitting a command to a call store. The Lock "0" and the Lock "1" conductors at the output terminals of the AND gates 8318 and 8319 are employed as input signals to the Timer 8800 and are also transmitted to the Timer Output Cable 8801 without alteration. If the GO Fail Flip-Flop 9310 has not been set at the end of a preceding operating cycle the occurrence of the Lock "0" or the Lock "1" signal during receipt of the immediately succeeding command will enable OR gate 9318 the output of which, in combination with the "0" output conductor of the GO Fail Flip-Flop 9310, will enable AND gate 9319. The output of the AND gate 9319 is the conductor 93PD0 which is connected through OR gates to the set terminals of the trouble flip-flops 84TBL0 and 84TBL1. Setting of these flip-flops inhibits further responses of the call store. A signal on conductor 93PD0 also serves to set the fault register flip-flop 93F1. Further, the "0" output conductor of the GO Fail Flip-Flop 9310 is one of the inputs to the OR gate 9307 and if the GO Fail Flip-Flop 9310 remains in the "0" state, the OR gate 9307 will be enabled and thus the transmission of an All Seems Well signal will be inhibited.

The Parity Failure Conductor 8905 at the output of the Parity Check Circuit 8901 is a second input to the OR gate 9307. The Parity Check Circuit 8901 checks for proper parity over the address bits, the code bits, and the address-parity bit and generates a trouble signal on conductor 89PF upon failure of parity. A signal on conductor 89PF inhibits operation of the Order Decoder 8902 and enables OR gate 9307.

A third input signal to the OR gate 9307 is the output of the AND gate 9316. As previously expalined, a reading of the left half of the memory is indicated by enablement of the fixed address match conductor 87 FADM and a reading of the right half of the memory by enablement of the variable address match conductor 87VADM. These conductors must be enabled on a mutually exclusive basis. The conductors 87FM and 87VM are enabled when the conductors 87FADM and 87VADM are enabled respectively. The conductors 87FM and 87VM if concurrently enabled serve to enable the AND gate 9316 and thus inhibit the All Seems Well signal by enabling OR gate 9307. An output signal of AND gate 9316 in combination with a timing signal on conductor 93SOLR will enable AND gate 9314 and will set the flip-flop 93F3 of the Fault Register 9300.

Similarly, a signal on the multiple mode conductor 93MM, which is an output signal of the Code and Mode Decoder 8700, serves to enable OR gate 9307 and at time SOLR enables AND gate 9315 and thus sets the multiple mode flip-flop 93F4 of the Fault Register 9300.

The fifth input to the OR gate 9307 is the no mode conductor 93NM which also is an output conductor of the Code and Mode Decoder 8700. In the event that the code and mode decoder receives an input signal from either conductor 87FADM or 87VADM without valid signals from the Mode Register 8704 the conductor NM will be enabled to enable the OR gate 9307 and thus inhibit generation of an All Seems Well signal.

The last input to the OR gate 9307 is the conductor 93GR0 which is an output conductor of the Order Decoder 8902. The conductor GR0 is enabled whenever the Order Decoder 8902 experiences invalid combinations of signals on the conductors C, $\overline{C}$, R, $\overline{R}$, W, and $\overline{W}$. The occurrence of invalid order codes will also serve to inhibit the generation of an All Seems Well signal.

As seen from the above description, the flip-flops 93F1 through 93F4 of the Fault Register 9300 are selectively set upon occurrence of particular ones of the above enumerated troubles. The flip-flop 93F0 is employed to record the occurrence of a signal on either conductor 93TP0 or 93TP1 during a normal or maintenance mode operation. The conductors 93TP0 and 93TP1 are enabled only during read control mode operations and are enabled on a mutually exclusive basis. These conductors provide gating signals to the call store response gates of FIG. 92 during control read operations. A signal on the M conductor, which is an output conductor of the Code and Mode Decoder 8700, indicates that a command other than a control read command is indicated. Therefore, a signal on the M conductor along with a signal on either conductor 93TP0 or 93TP1 will enable AND gate 9312 or AND gate 9311 and will serve to set the flip-flop 93F0.

*Write Commands*

Normal mode read and write commands are distinguished by the coding of the information on the R and W conductors. The R flip-flop of the Order and Parity Register 8900 will be set and the W flip-flop reset in the case of a normal read command, while the W flip-flop will be set and the R flip-flop reset in the case of a normal write command. In a normal write mode operation the reading of information from the memory to the Data Register 9016 is inhibited; information is received from the appropriate data bus and placed in the Data Register 9016; and the access and inhibit drive current drive circuitry is controlled to write a new word in the appropriate memory location in accordance with the contents of the Data Register 9016.

That is although data is read from the Memory 8500 at the address location and then appears on the discriminator output conductors R0 through R23, this data is not gated to the Data Register 9016 as the AND gates 9012 and 9013 intentionally are not enabled. Similarly, information read from the memory is not transmitted to the buses of the Call Store Response Bus System 6501 as the AND gates such as 9210 and 9220 are also not enabled. The gating of data from the Memory 8500 to the Data Register 9016 is under the control of the REG conductor which is one of the output signals of the Order Decoder 8902. The gating of data to the buses is under control of the RO0 and RO1 conductors which are output conductors of the Answer Control 9102.

In a write operation the information on the Call Store Write Data Bus 8650 or 8651 of the Bus System 6402 is transmitted from a Central Control 101 to the Call Store 103 in the third wave which is approximately 2.5 microseconds after the transmission of the address code and mode bits. The write data word if accepted from the "0" bus 8650 is transmitted through a plurality of transformers such as 8612, amplifiers such as 8614, AND gates such as 8622, OR gates such as 8625, conductor group 8627, OR gate 9010 and OR gates such as 9014 and 9015 to the set terminals of the individual stages D0 through D23 of the Data Register 9016. The Data Register 9016 is reset prior to receipt of the information on the write data bus.

After registration of the write data word in the Data Register 9016 the operation of the store relative to the entry of information into the Memory 8500 proceeds in substantially the same manner as the regeneration of information in the case of a normal read order.

*Maintenance Modes*

A call store is arranged to be operated in either an H maintenance mode or a G maintenance mode and in these modes information may be read from the store or new data may be written into the store. An indication that the store is to perform in the H or G maintenance mode is indicated by the coding of the CM, GM, and HM conductors and thus in accordance with the setting of the individual stages C, G, and H of the Mode Register 8704. The setting of any one of the stages C, G, or H of the Mode Register 8704 will disable AND gate 8702 and thus disable the Variable Address Matcher 8703. This makes the store insensitive to the code name which is stored in the Variable Name Register 9100. Therefore only the call store which is addressed by its fixed code name will respond. It is therefore possible to preclude responses from one of the two stores which contain the two copies of data.

*Control Modes*

The control write mode permits two classes of operation. In the first class of operation information transmitted from Central Control 101 via the Call Store Write Data Bus System 6402 is employed to selectively set or reset the flip-flops of the Variable Name Register 9100, the flip-flops of the Routing Register 9101, and the Data Register 9016. In the second class of operation, information derived from within the X and Y Access Circuits 8501 and 8502 is inserted in the Data Register 9016 and on a subsequent control mode read operation the contents of the data register are transmitted to Central Control 101.

The class of operation to be performed is determined by the input signals to the Control Address Decoder 8403. The control address decoder is required in both the write control mode and the read control mode. The Control Address Decoder 8403 is enabled by either a signal on the CR conductor or a signal on the CW conductor and both of these are output conductors of the Order Decoder 8902. That is, when the Code and Mode Decoder 8700 recognizes a control mode command (conductor 87C enabled), the CR and CW conductors are selectively enabled in accordance with the settings of the R and W flip-flops of the Order and Parity Register 8900. The timing of output signals of the Control Address Decoder 8403 is under the control of a timing pulse on the conductor SOER which is one of the output conductors of the Timer 8800. The particular class of control write or control read to be performed is dictated by the contents of the first four stages of the Address Register 8400. In the case of a control mode command the first wave of information comprises the following:

(A) An address in which the bits A0 through A3 are coded to indicate the class of operation required;

(B) The code name bits K0 through K5;

(C) The mode bits CM, GM, and HM; and (D) First synchronizing signal "Sync 1."

The second wave of information comprises the parity bit, the read and write bits, and the second synchronizing bit "Sync 2."

The third wave of information in the case of the first class of operation comprises a twenty bit word the coding of which defines the desired states of the flip-flops of the Variable Name Register 9100 and the flip-flops of the Routing Register 9101. In the second class of control mode write operation the data from Central Control 101 via the Call Store Write Data Bus System 6402 is not required.

In the first class of write control operation, information is gated from the appropriate bus "0" or "1" via its associated AND gate such as 8620 or 8621, OR gate 8624, conductor group 8626 to the set and reset terminals of the Name and Routing Registers 9100 and 9101. The selective setting and resetting of the flip-flops of the Variable Name Register 9100 and of the Routing Register 9101 are thus directly accomplished.

In the second class of control mode write operation the coding of the address bits A0 through A3 dictates that particular timing information be read into the Data Register 9016. In the second class of operation two groups of signals may be selectively employed to set the Data Register 9016. If the first group of informtion is to be employed, the coding of the address bits A0 through A3 will cause the Control Address Decoder 8403 to provide an output signal on the AT1 conductor. The AT1 conductor is an input signal to the Y Access Circuit 8502 and this causes a number of output signals to appear on certain pairs of conductor group 8511. The AT1 conductor is also transmitted via the Control Address Decoder Output Cable 8451 to FIG. 18 (93) and thus via the AT1 conductor, OR gate 9301, AND gate 9302, inverter 9303, and AND gate 9304 to the set conductor of the flip-flop 93TT1. The output conductor TT1 of the flip-flop 93TT1 is an enable signal to the AND gate 9008. When enabled AND gate 9008 passes the information on conductor group 9019 to OR gate 9010, and OR gates such as 9014 and 9015 to selectively set the stages of the Data Register 9016. The information on conductor group 9019 is derived from a number of locations within the call store control circuitry. The XRG, XWG, CCK, PCG, SOER, SOW, SBT, EOWP, and HINH are all output signals of the Timer 8800. The signals on the conductors XREA, XRLA, XW0A, and XW1A are all output signals of the X access circuit which are transmitted via certain pairs of conductor group 8510 and the Row Test Cable 8450.

The determination that this particular group of information is to be read into the Data Register 9016 is in accordance with the coding of the address bits A0 through A3. In response to the particular code which indicates that this information is to be transmitted to the data register the P conductor of the Control Address Decoder 8403 will be enabled and, as seen in FIG. 18 (93), conductor P is one of the inputs to AND gate 9304 which, when enabled, serves to set flip-flop 93TT1. If the second group of information of the same nature is to be transmitted to the Data Register 9016, the coding of the address bits A0 through A3 will be such as to cause the Control Address Decoder 8403 to provide output signals on the conductors AT2 and Q and thus actions will be started within the Y Access Circuit 8502 and the flip-flop 93TT2 will be set. The TT2 output conductor of the flip-flop 93TT2 serves to enable AND gate 9009 and thus transmit to the Data Register 9016 the information on conductor group 9020.

In the control mode read operation five classes or rows of information may be selectively gated and transmitted via a selected bus to Central Control 101. The particular information to be read is determined by the coding of the address bits A0 through A3 or by the setting of the order flip-flops 89R and 89W. The gating of the five classes or rows of information in the Call Store 103 to Central Control 101 is shown schematically in FIGS. 15 (90) and 17 (92). Information which does not rely upon the setting of the Address Register 8400 in accordance with the received command is gated under the control of the address bits A0 through A3. However, where information which is dependent upon the proper setting of the Address Register 8400 is to be gated such information is gated under the control of the states of the 89R flip-flop and the 89W flip-flop of the Order and Parity Register 8900. For example, output signals of the X Access Circuit 8501 and of the Y Access Circuit 8502 are gated to the input of the OR gate 9208 under control of signals on conductors 92DRC–2 and 92DRC–3. Conductors 92DRC–2 and 92DRC–3 are output conductors of the Order Decoder 8902.

The first class of information comprises the contents of the Data Register 9016 and this information is gated through AND gate 9200, OR gate 9208, conductor group 9209, and the appropriate Call Store Response Gate 9212 or 9222. AND gate 9200 is enabled by a signal on conductor 92DRC–1 which is an output conductor of the Control Address Decoder 8403. Similarly, the information shown as being transmitted by the conductor groups 9004 and 9003 is transmitted through AND gates 9203 and 9204 under control of signals on conductors 92DRC–4 and 92DRC–5 respectively, which are also output conductors of the Control Address Decoder 8403.

In addition to providing means for transmitting discrete maintenance information from the Call Store 103 to the Central Control 101 over the Call Store 103 to Call Store Response Bus System 6501 there is also provided access to a number of voltage test points within the Call Store 103. This access, the capability of which is utilized by the Central Control 101, is by way of scan points in the Master Scanner 144. As seen in FIG. 19(94), the test points within the Power Supply 9400 are connected via contacts of the relays 94FA2 and 94FA3. The relays 94FA1 through 94FA4 are selectively controlled by output signals of the signal distributor which is located on the miscellaneous trunk frame 138. The connection from the Signal Distributor 140 to the Call Store 103 is not shown but is described at this time. The relays 94FA1 and 94FA4 are employed to test the ferrods associated with the voltage test points. The assignment of the scan points in the Master Scanner 144 is known to the Central Control 101 and these points are interrogated by a directed scan rather than by a sequential scan such as is undertaken with respect to the scanning of lines and trunks. The voltage test points of the Call Store 103 are connected to the Master Scanner 144 via the Call Store Diagnostic Cable 6903.

It is to be understood that the above described arrangements are but illustrative of the application of the principles of the invention. Numerous other arrangements may be devised by those skilled in the art without departing from the spirit and scope of the invention.

What is claimed is:

1. The combination in accordance with claim 12 wherein said means interconnecting said central control and said memory arrangement comprises a duplicated command bus system for transmitting said code-address command signals from said central control to said independent memory units, duplicated response bus systems for transmitting information read from said memory arrangement to said central control, and wherein each of said independent memory units comprises a control flip-flop and means responsive to the state of said control flip-flop for associating said independent memory unit with one of said command buses of said duplicated command bus system.

2. In combination, a memory system comprising a plurality of independent memory units, each of said memory units responsive to memory commands comprising a code portion and an address portion, each of said independent memory units comprising command register means, means responsive to commands having a particular code portion for generating a fixed name match signal, a variable name register, means responsive to particular memory commands for writing name indicia in said variable name register, a variable address matcher for comparing the code portion of the contents of said command register means and the contents of said variable name register for generating a variable name match signal, and control means responsive to said fixed name match signal, said variable name match signal, and the remainder of said command for controlling said memory unit.

3. The combination in accordance with claim 2 wherein said memory commands further comprise a mode portion and said control means further comprises means responsive to said mode portion for inhibiting the generation of said variable name match signal.

4. The combination in accordance with claim 2 wherein said memory commands further comprise an order portion and a data portion, and said control means is responsive to said order portion for reading information from said memory unit and to write said data portion into said memory unit.

5. In combination, a memory system, a central control for generating memory commands for controlling said memory system, said memory system comprising a plurality of independent memory units and duplicate command transmission means interconnecting said central control and said memory system for transmitting said memory commands, a memory response transmission system interconnecting said memory system and said central control for transmitting information obtained from said memory system to said central control, each of said memory units comprising a control register for associating its memory unit with a particular command bus of the command bus system, a routing register for associating its memory unit with a particular bus of the response bus system, and means for transmitting commands from said central control for controlling said control register and for controlling said routing register.

6. In combination, a memory arrangement comprising a plurality of independent memory units, each of said memory units comprising a pair of blocks of memory, the information in each block of one memory unit being duplicated in a memory unit different from a memory unit in which information in the other block of said one memory unit is duplicated, means responsive to a fixed address for obtaining access to a first of said blocks in one memory unit, means responsive to a variable address for obtaining access to the second of said blocks in said one memory unit, and means for transferring information from a different memory unit on failure of said different memory unit to said second block of said one memory unit and for assigning a variable address discrete to said different memory unit to said one memory unit for obtaining access to said information from said different memory unit in said one memory unit.

7. In combination, a central data processor comprising a central control, a memory arrangement and transmission means interconnecting said central control and said memory arrangement, said central control comprising means for generating commands for controlling said memory arrangement, certain of said commands being memory commands and other of said commands being control commands, said memory arrangement comprising a plurality of independent memory units, each of said memory units comprising a memory proper and control means including a plurality of control locations, said control means responsive to said memory commands to control said memory proper and responsive to said control commands for providing access to said control locations, said transmission means comprising a command transmission bus system for transmitting said commands from said central control to said memory arrangement and a response bus system for transmitting responses from said memory arrangement to said central control, said command transmission bus system comprises a "0" command bus and a "1" command bus, said response bus system comprises a "0" response bus and a "1" response bus, said memory proper comprises a left half a right half, said control means comprises a plurality of response control flip-flops, and said control means is responsive to said memory commands to selectively read information from said left half or said right half of said memory proper and responsive to the states of said response control flip-flops and a portion of said memory command to selectively transmit information read from said memory proper to said "0" response bus and to said "1" response bus.

8. The combination in accordance with claim 7 wherein said control means further comprises a plurality of trouble flip-flops, said control means responsive to the states of said trouble flip-flops to selectively inhibit operation of said memory unit with said "0" and "1" command buses and said "0" and "1" response buses.

9. The combination in accordance with claim 7 wherein said control flip-flops comprise a left side "0" bus flip-flop, a left side "1" bus flip-flop, a right side "0" bus flip-flop and a right side "1" bus flip-flop.

10. In combination, a central data processor comprising a central control, a memory arrangement and transmission means interconnecting said central control and said memory arrangement, said central control comprising means for generating memory commands comprising a code portion, a mode portion and an address portion, certain of said commands being normal mode commands and other of said commands being maintenance mode commands, said maintenance mode commands comprising left maintenance commands and right maintenance commands, said memory arrangement comprising a plurality of independent memory units, each of said independent memory units comprising a left memory block, a right memory block and control means common to said memory blocks, each of said control means responsive to normal mode commands which include first and second codes discrete to said left memory block and said right memory block associated with said control means, and said control means responsive to maintenance mode commands which include said first code.

11. The combination in accordance with claim 10 wherein said transmission means comprises "0" and "1" bus systems for transmitting said commands from said central control to said memory arrangement and for transmitting information from said memory arrangement to said central control, and said control means includes a control flip-flop, said control means responsive to the state of said control flip-flop for selectively receiving memory commands from said "0" bus system and said "1" bus system and responsive to the state of said control flip-flop and said maintenance mode commands for selectively transmitting information to said central control via said "0" and said "1" bus systems.

12. In combination, a central control, a bulk memory arrangement comprising a plurality of independent memory units, and means interconnecting said central control and said memory arrangement for transmitting thereto code address signals defining information locations within said memory units, each of said memory units comprising a pair of blocks of memory and control circuits common to said blocks of memory, the information in each block of a particular memory unit being duplicated in a memory unit other than one in which information in the other block of said particular memory unit is duplicated, and said control circuits including means responsive to said code address signals to define the same duplicated information in two different memory units.

13. The combination of claim 12 wherein said means defining the same duplicated information includes a fixed address means for defining the information in one of said memory units and a variable address register for defining the information in the other of said memory units and further comprising means for modifying said variable address register.

14. In combination, a central data processor comprising a memory arrangement comprising a plurality of independent memory units each comprising a memory array and control means including a plurality of control register means, a central control for generating memory commands for reading data from and writing data into said memory arrays and said control register means of said memory units, and transmission means including alternate bus means interconnecting said central control and said memory units, said control register means determining the portion of a memory array to be addressed and the alternate bus means to be employed, said control means of each memory unit including means responsive to certain of said memory commands to provide access to said memory array to place data from the addressed portion of said memory array onto the employed alternate bus means and responsive to other of said memory commands to provide access to said control register means to place the data stored in said control register means on the employed alternate bus means independent of any data from said memory array.

References Cited by the Examiner

UNITED STATES PATENTS

| | | | |
|---|---|---|---|
| 2,853,695 | 9/1958 | Chu | 340—173 |
| 3,029,414 | 8/1962 | Schrimpf | 340—172.5 |
| 3,060,273 | 10/1962 | Nowak et al. | 179—27.4 |
| 3,061,192 | 10/1962 | Terzian | 235—157 |
| 3,089,124 | 5/1963 | Hagen et al. | 340—172.5 |
| 3,200,380 | 8/1965 | MacDonald et al. | 340—172.5 |
| 3,222,653 | 12/1965 | Rice | 340—172.5 |
| 3,234,521 | 2/1966 | Weisbecker | 340—172.5 |

ROBERT C. BAILEY, *Primary Examiner.*

I. S. KAVRUKOV, *Assistant Examiner.*